United States Patent
Burgess et al.

(10) Patent No.: US 9,377,121 B2
(45) Date of Patent: Jun. 28, 2016

(54) LEAK-FREE ROTARY VALVE WITH INTERNAL WORM GEAR

(71) Applicant: Big Horn Valve, Inc., Sheridan, WY (US)

(72) Inventors: Kevin Burgess, Sheridan, WY (US); David Yakos, Bozeman, MT (US); Bryan Walthall, Bozeman, MT (US)

(73) Assignee: Big Horn Valve, Inc., Sheridan, WY (US)

( * ) Notice: Subject to any disclaimer, the term of this patent is extended or adjusted under 35 U.S.C. 154(b) by 549 days.

(21) Appl. No.: 13/680,078

(22) Filed: Nov. 18, 2012

(65) Prior Publication Data

US 2013/0175463 A1 Jul. 11, 2013

Related U.S. Application Data

(63) Continuation-in-part of application No. 13/356,628, filed on Jan. 23, 2012, now abandoned, and a continuation-in-part of application No. 13/310,733, filed on Dec. 3, 2011, now abandoned.

(51) Int. Cl.
| | |
|---|---|
| *F16K 31/08* | (2006.01) |
| *F16K 31/04* | (2006.01) |
| *F16K 31/54* | (2006.01) |
| *F16K 31/05* | (2006.01) |

(52) U.S. Cl.
CPC .............. *F16K 31/041* (2013.01); *F16K 31/043* (2013.01); *F16K 31/055* (2013.01); *F16K 31/088* (2013.01); *F16K 31/54* (2013.01)

(58) Field of Classification Search
CPC ... F16K 31/041; F16K 31/055; F16K 31/043; F16K 31/088; F16K 31/54; F16K 31/06; F16K 31/08; F16K 31/086

USPC ......................................... 251/65, 249.5, 248
See application file for complete search history.

(56) References Cited

U.S. PATENT DOCUMENTS

| | | | | |
|---|---|---|---|---|
| 1,966,209 | A | * | 7/1934 | Miller ...................... 251/129.03 |
| 2,289,574 | A | | 7/1942 | Carlson |
| 3,793,893 | A | * | 2/1974 | Heinen .......................... 74/22 R |
| 3,908,959 | A | | 9/1975 | Fichtner |
| 4,114,465 | A | * | 9/1978 | Troy ............................. 74/89.17 |
| 4,261,224 | A | * | 4/1981 | Sulzer ................................ 475/2 |
| 4,274,444 | A | | 6/1981 | Ruyak |
| 4,284,262 | A | | 8/1981 | Ruyak |
| 4,296,912 | A | | 10/1981 | Ruyak |
| 4,327,892 | A | * | 5/1982 | Ruyak ............................. 251/65 |
| 4,994,001 | A | * | 2/1991 | Wilkinson et al. ................ 475/4 |
| 5,477,752 | A | * | 12/1995 | West et al. ...................... 74/625 |
| 5,484,133 | A | | 1/1996 | Oliver |

(Continued)

Primary Examiner — Craig Schneider
Assistant Examiner — Andrew J Rost
(74) Attorney, Agent, or Firm — Antoinette M. Tease

(57) ABSTRACT

A rotary valve assembly composing a leak-free enclosure containing a worm gear and a pinion gear, an adapter plate that is situated between a rotary valve body and the enclosure and that secures the rotary valve body to the enclosure, and a magnetic actuator assembly. The worm gear engages with the pinion gear such that when the worm gear rotates, the pinion gear rotates as well. The enclosure is situated between the magnetic actuator assembly and the rotary valve body. A shaft extends through the center of the pinion gear and causes a valve within the rotary valve body to open and close based on rotation of the shaft. In an alternate embodiment, the invention is a rotary valve as described above with an integral adapter plate.

18 Claims, 28 Drawing Sheets

(56) References Cited

U.S. PATENT DOCUMENTS

| | | |
|---|---|---|
| 6,003,837 A * | 12/1999 | Raymond et al. ........ 251/129.12 |
| 6,079,442 A * | 6/2000 | Raymond et al. ............ 137/554 |
| 6,786,237 B2 * | 9/2004 | Yajima et al. ............ 137/625.65 |
| 7,192,004 B2 * | 3/2007 | Chen ........................ 251/129.03 |
| 2008/0073606 A1 | 3/2008 | Liantonio |
| 2012/0187319 A1 | 7/2012 | Burgess et al. |

* cited by examiner

LEAK-FREE ROTARY VALVE WITH INTERNAL WORM GEAR

CROSS-REFERENCE TO RELATED APPLICATION

This application is a continuation-in-part of U.S. patent application Ser. No. 13/356,628 filed on Jan. 23, 2012, which in turn is a continuation-in-part of U.S. patent application Ser. No. 13/310,733 filed on Dec. 3, 2011.

BACKGROUND OF THE INVENTION

1. Field of the Invention

The present invention relates generally to the field of valves, and more specifically, to a leak-free rotary valve with a worm gear situated between the magnetic actuator and the valve body.

2. Description of the Related Art

Quarter-turn valves require substantial torque to operate effectively. This is especially true of plug valves and butterfly valves. Breakaway torques required to open and close these valves can be huge. A simple mechanical connection to a handwheel or drive motor without gear reduction would be impractical in most valve sizes. For example, it would be impossible for most people to be able to manually open and close a four-inch plug valve without any gear reduction. By the same token, the motor required to produce the same amount of torque in an automatic actuator without gear reduction would be larger than the valve itself. When adding a magnetic coupling to the mix, it is even more impractical to produce large torques without gear reduction. The coupling also would be larger than the valve itself and very expensive to produce.

There is no getting around the need to provide gear reduction in the actuators that open and close these valves. Gear reduction makes it possible to manually open and close all but the largest of valves. Gear reduction also makes it possible to design practical automatic and control actuators for all quarter-turn valves. Most importantly, gear reduction makes it possible to design a magnetic coupling for all quarter-turn valves that is practical in size as well as in cost.

There are three basic types of gearing that can provide the necessary reduction tor practical actuation of quarter-turn valves: spur, or helical, gears; planetary gears; and worm gears. Spur gears are the most efficient of the three, but they require more room that the other types of gears to provide a given gear ratio. They also require that the input shaft into the gearset be offset from the output shaft or the gearset, which makes mounting the actuator more complicated. Planetary gears are also more efficient than worm gears. Because there is no offset between the input shaft and the output shaft, they take up less room than spur gears and can be mounted directly over the valve stem.

When using gears in retrofit valve actuators, there are other factors to consider besides efficiency. The following advantages are provided by worm gear designs:

(1) Worm drives provide a built-in braking system; i.e., they will not move when force is applied to the drive system from the downstream (reduction) side. This is important, particularly with butterfly valves in a partial open position. High fluid velocities inside the valve can deflect the position of the valve unless held rigidly by the actuator. This is also true with ball valves, although the forces are not as severe. With planetary or spur gear designs, a separate braking system must be implemented into the drive system because the gears do not provide braking.

(2) Worm driven dominate the quarter-turn valve actuation industry. They are by far the most popular method of reducing speed and increasing torque to the valve. In other words, they are accepted by the industry.

(3) Worm drives contain less gearing for a given reduction ratio. For example, to provide a reduction ration of 20:1, a stack of at least three planetary gearsets would be required. By contrast, a single worm drive can provide the same ratio. This makes the worm drive much more economical to manufacture.

(4) The worm drive gearbox is more compact than either the spur gear or the planetary gear designs, especially when providing reduction ratios of 20:1 or greater. Because the gearset contains only two gears, the gearbox can be made much smaller in volume. This is important in high-pressure applications where the size of the gearbox determines the wall thickness required to hold a given pressure. A larger gearbox requires a thicker wall to hold the same pressure that a smaller gearbox can hold with a smaller wall thickness. Again, this leads to a reduction in manufacturing costs.

Unlike other gear trains, the direction of transmission in a worm gear (input shaft versus output shaft) is not reversible when using large reduction ratios, due to the greater friction involved between the worm and worm-wheel, or gear. One cannot turn the gear by applying torque to the output shaft. In this case, the worm gear is considered to be self-locking. Technically speaking, this occurs when the tangent of the lead angle of the worm is less than the coefficient of friction between the worm and the gear. High gear reduction worm drives require a very shallow lead angle, so in most cases the lead angle is indeed less than the coefficient of friction between the gear teeth; i.e., the worm gear is self-locking.

When actuating valves, the self-locking feature of the worm gear is especially advantageous. For example, butterfly valves have a tendency to move from a given position because the paddle of the valve is being pushed on by the fluid in the valve. This is especially prevalent when the valve is being used to throttle the now of fluid, i.e., when there is a large pressure drop as the fluid passes through the valve. In this case, ordinary gear trains will not be able to hold the paddle stationary. Instead, forces applied to the paddle by the fluid are converted to torque that will turn the output shaft of the gear train. Unless a braking mechanism is positioned somewhere between the drive motor (handwheel) and the valve, the valve will wander out of position, turning the motor or handwheel away from its intended position. With a high-reduction, self-locking worm gear, this does not happen because of the inherent self-locking feature of the gear train.

BRIEF SUMMARY OF THE INVENTION

The present invention is a rotary valve assembly comprising: a leak-free enclosure containing a worm gear having a first end and a second end and a pinion gear having a first side and a second side, wherein the worm gear engages with the pinion gear such that when the worm gear rotates, the pinion gear rotates as well; an adapter plate that is situated between a rotary valve body and the enclosure and that secures the rotary valve body to the enclosure; and a magnetic actuator assembly; wherein the enclosure is situated between the magnetic actuator assembly and the rotary valve body; and wherein a shaft extends through the center of the pinion gear and causes a valve within the rotary valve body to open and close based on rotation of the shaft.

In a preferred embodiment, the magnetic actuator assembly comprises: a driver support that contains a plurality of outer magnets; a driver base that holds the driver support; and a follower support that contains a plurality of inner magnets; wherein the enclosure comprises a portion of the enclosure that is situated inside of the driver support between the plurality of inner magnets and the plurality of outer magnets; wherein the driver base is fixedly attached to an actuator wheel such that the driver base rotates when the actuator wheel rotates; wherein the driver support is fixedly attached to the driver base such that the driver support rotates when the driver base rotates; and wherein when the driver support rotates, a magnetic coupling between the plurality of inner magnets and the plurality of outer magnets causes the follower support to rotate. Preferably, the invention further comprises a magnet retainer that is secured to the enclosure and that prevents the driver base from being pulled off of the enclosure.

In a preferred embodiment, the invention further comprises a first bearing situated around the first end of the worm gear and a second bearing situated around the second end of the worm gear. Preferably, the first end of the worm gear passes through the follower support and into the first bearing, and the second end of the worm gear passes through the second bearing and is inserted into a cap that is secured to the enclosure. The worm gear preferably comprises a shaft that is configured to rotate with the follower support.

In a preferred embodiment, the invention further comprises a first bearing situated adjacent to the first side of the pinion gear and a second bearing situated adjacent the second side of the pinion gear. Preferably, the enclosure comprises a first positive stop and a second positive stop that prevent the pinion gear from over-rotating. The shaft preferably comprises a top end, and the enclosure preferably comprises a position indicator window that allows the top end of the shaft to be viewed by an operator.

In an alternate embodiment, the magnetic actuator assembly comprises: a radial enclosure; a radial driver support containing a plurality of radial driver magnets; a radial follower support containing a plurality of radial follower magnets; and a radial cap that is attached to the radial enclosure and situated between the radial driver support and the radial follower support; wherein the worm gear is configured to rotate with the radial follower support; and wherein an actuator wheel is fixedly attached to a radial driver cap that is fixedly attached to the radial driver support. Preferably, the invention further comprises a magnet retainer that is secured to the radial cap and that prevents the radial driver cap from being pulled off of the radial cap.

In yet another preferred embodiment, the shaft comprises a top end, and the invention further comprises a ring magnet positioned on the top end of the shaft and a proximity sensor positioned outside of the enclosure and in proximity to the ring magnet.

In an alternate embodiment, the invention is a rotary valve comprising: a rotary valve body having an integral adapter plate: a leak-free enclosure containing a worm gear having a first end and a second end and a pinion gear having a first side and a second side, wherein the worm gear engages with the pinion gear such that when the worm gear rotates, the pinion gear rotates as well; and a magnetic actuator assembly; wherein the integral adapter plate is situated between the rotary valve body and the enclosure and secured to the enclosure; wherein the enclosure is situated between the magnetic actuator assembly and the rotary valve body; and wherein a shaft extends through the center of the pinion gear and causes a valve within the rotary valve body to open and close based on rotation of the shaft.

In a preferred embodiment, the magnetic actuator assembly comprises: a driver support that contains a plurality of outer magnets; a driver base that holds the driver support; and a follower support that contains a plurality of inner magnets; wherein the enclosure comprises a portion of the enclosure that is situated inside of the driver support between the plurality of inner magnets and the plurality of outer magnets; wherein the driver base is fixedly attached to an actuator wheel such that the driver base rotates when the actuator wheel rotates; wherein the driver support is fixedly attached to the driver base such that the driver support rotates when the driver base rotates; and wherein when the driver support rotates, a magnetic coupling between the plurality of inner magnets and the plurality of outer magnets causes the follower support to rotate. Preferably, the invention further comprises a magnet retainer that is secured to the enclosure and that prevents the driver base from being pulled off of the enclosure.

In a preferred embodiment, the invention further comprises a first bearing situated around the first end of the worm gear and a second bearing situated around the second end of the worm gear. Preferably, the first end of the worm gear passes through the follower support and into the first bearing, and the second end of the worm gear passes through the second bearing and is inserted into a cap that is secured to the enclosure. The worm gear preferably comprises a shaft that is configured to rotate with the follower support.

In a preferred embodiment, the invention further comprises a first bearing situated adjacent to the first side of the pinion gear and a second bearing situated adjacent the second side of the pinion gear. Preferably, the enclosure comprises a first positive stop and a second positive stop that prevent the pinion gear from over-rotating. The shaft preferably comprises a top end, and the enclosure preferably comprises a position indicator window that allows the top end of the shaft to be viewed by an operator.

In an alternate embodiment, the magnetic actuator assembly comprises: a radial enclosure; a radial driver support containing a plurality of radial driver magnets; a radial follower support containing a plurality of radial follower magnets; and a radial cap that is attached to the radial enclosure and situated between the radial driver support and the radial follower support; wherein the worm gear is configured to rotate with the radial follower support; and wherein an actuator wheel is fixedly attached to a radial driver cap that is fixedly attached to the radial driver support. Preferably, the invention further comprises a magnet retainer that is secured to the radial cap and that prevents the radial driver cap from being pulled off of the radial cap.

In yet another preferred embodiment, the shaft comprises a top end, and the invention further comprises a ring magnet positioned on the top end of the shaft and a proximity sensor positioned outside of the enclosure and in proximity to the ring magnet.

REFERENCE NUMBERS

Figure 1:
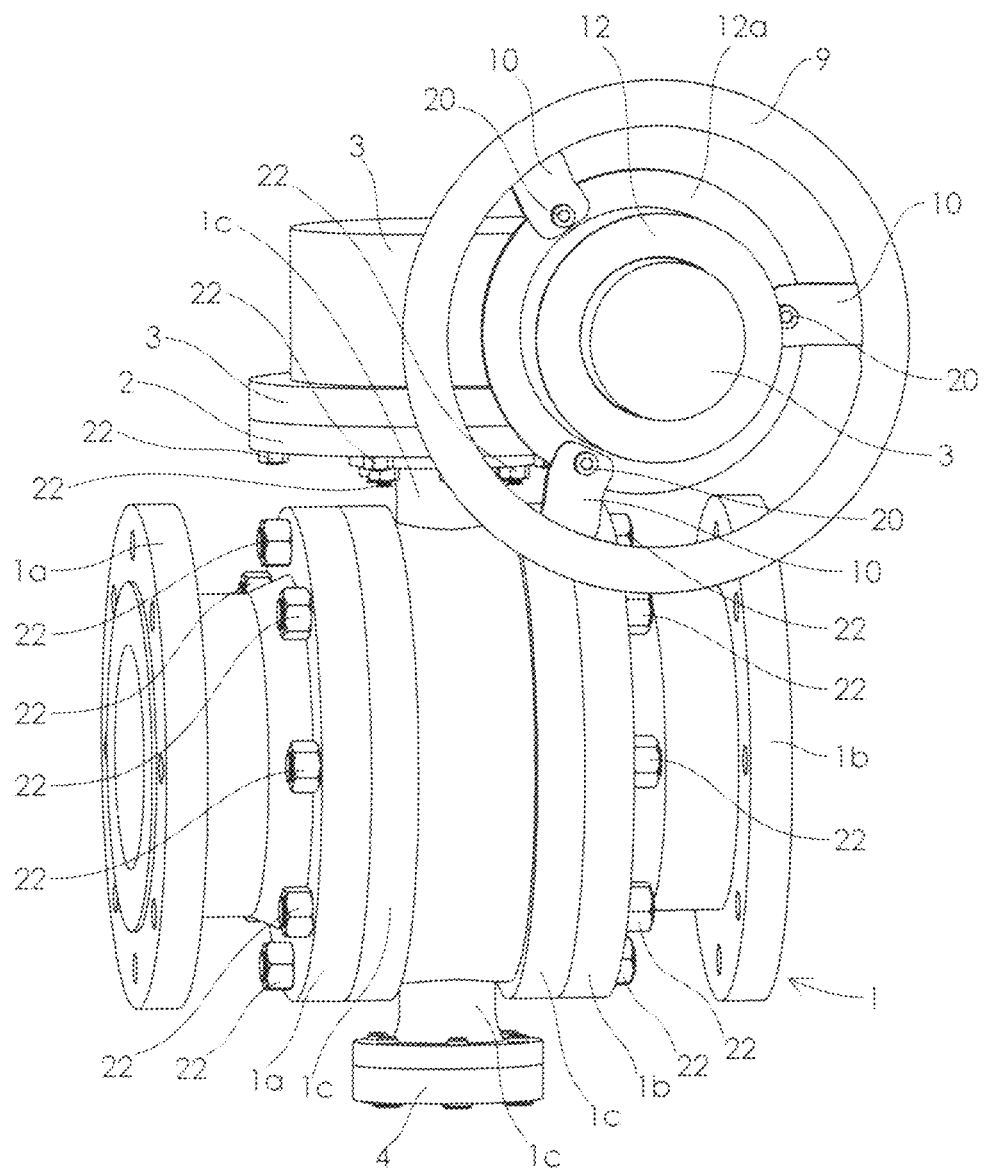
FIG. 1 is a front perspective view of the present invention.

1 Ball valve body
1a Left body (of ball valve body)
1b Right body (of ball valve body)
1c Center body (of ball valve body)
1d Recess (in top of valve body)
2 Adapter plate
2a Seal groove
2b Bearing holder
3 Enclosure
3a Positive stop (of enclosure)
3b Radial enclosure
3c Position gauge
3d Window
3e Portion (of enclosure)
3f Flange (of radial enclosure)
4 Cap
5 Shaft
5a Position indicator
6 Shaft key
7 Seal
8 O-ring
9 Actuator wheel
10 Actuator spoke
11 Driver support
12 Driver base
12a Flange (of driver base)
13 Outer magnet
14 Follower support
14a Key slot (of follower support)
15 Inner magnet
16 Worm gear
16a Bearing interface
16b Key
17 Pinion gear
17a Positive stop (of pinion gear)
18 Ball bearing
18a Outer ring (of ball bearing)
18b Inner ring (of ball bearing)
18c Ball (of ball bearing)
18d Cage (of ball bearing)
19 Seat
20 Screw
21 Gasket
22 Nut
23 Magnet retainer (for cylindrical magnets)
23a Magnet retainer (for radial magnets)
24 Motor
25 Motor drive gear
26 Motor ring gear
27 Ring magnet
28 Ball
29 Position sensor
30 Radial magnet
31 Radial driver cap
32 Radial cap
33 Radial driver support
34 Radial follower support
34a Key slot (of radial follower support)
35 Plug valve body
36 Rubber spring gasket
37 Stud
38 Trunnion
39 Plug
40 Butterfly
41 Butterfly valve body
42 Adapter plate/bonnet (of stand-alone valve)
42a Bearing holder (in adapter plate/bonnet)
43 Top entry valve body
44 Journal bearing

DETAILED DESCRIPTION OF INVENTION

Figure 27:
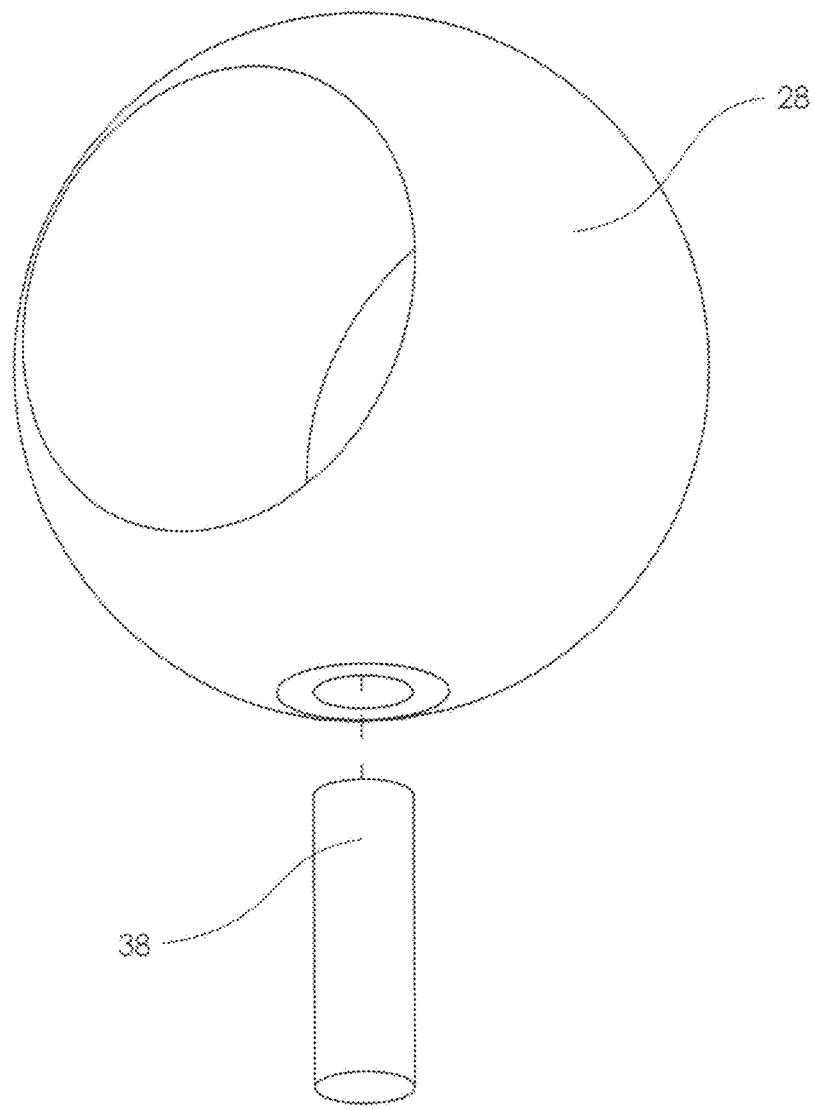
FIG. 27 is a detail view of the ball and trunnion.

FIG. 1 is a front perspective view of the present invention. This figure shows the ball valve body 1 (including the left body 1a, right body 1b, and center body 1c), adapter plate 2, enclosure 3 and cap 4. The left and right bodies 1a, 1b are preferably secured in the center body 1c with studs 37 (see FIGS. 8-9, 13 and 15) and nuts 22. The adapter plate 2 secures the enclosure 3 to the valve body 1. Two caps 4 are shown in FIG. 1; one of the caps 4 is secured to the center body 1c and holds the trunnion 38 in place (see FIG. 8), and the other cap 4 is secured to the enclosure 3 and holds the ball bearing 18 on one end of the worm gear 16 in place (see FIG. 4). (See also FIG. 27 for a detail view of the ball 28 and trunnion 38; the ball 28 rotates on the trunnion 38.)

Also shown in FIG. 1 is the actuator wheel 9, which comprises a plurality of actuator spokes 10. The driver base 12 holds the driver support 11, and it also has a flange 12a for attaching the actuator spokes 10 or ring gear 26 (see FIG. 20). In this embodiment, the actuator spokes 10 are secured to the driver base with screws 12, but the present invention is not limited to any particular manner of securing the actuator wheel 9 to the driver base 12.

Figure 2:
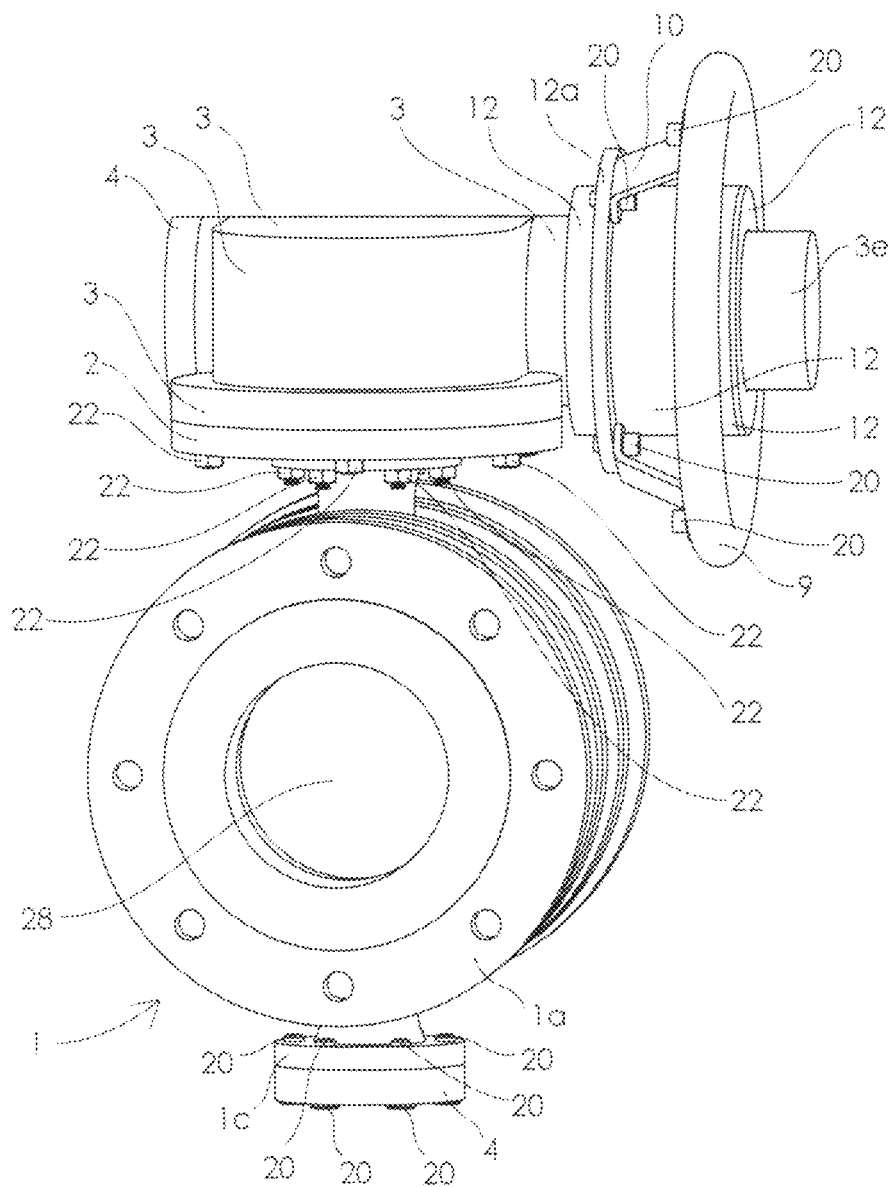
FIG. 2 is a side perspective view of the present invention.

FIG. 2 is a side perspective view of the present invention. This figure shows all of the same parts as in FIG. 1, except that the ball 28 is also shown. Note that although FIGS. 1-16 are drawn with a ball valve embodiment, the present invention is not limited to any particular type of rotary valve. As shown in subsequent figures, the present invention may also be used with plug valves, butterfly valves, or any other kind of rotary valve.

Figure 3:
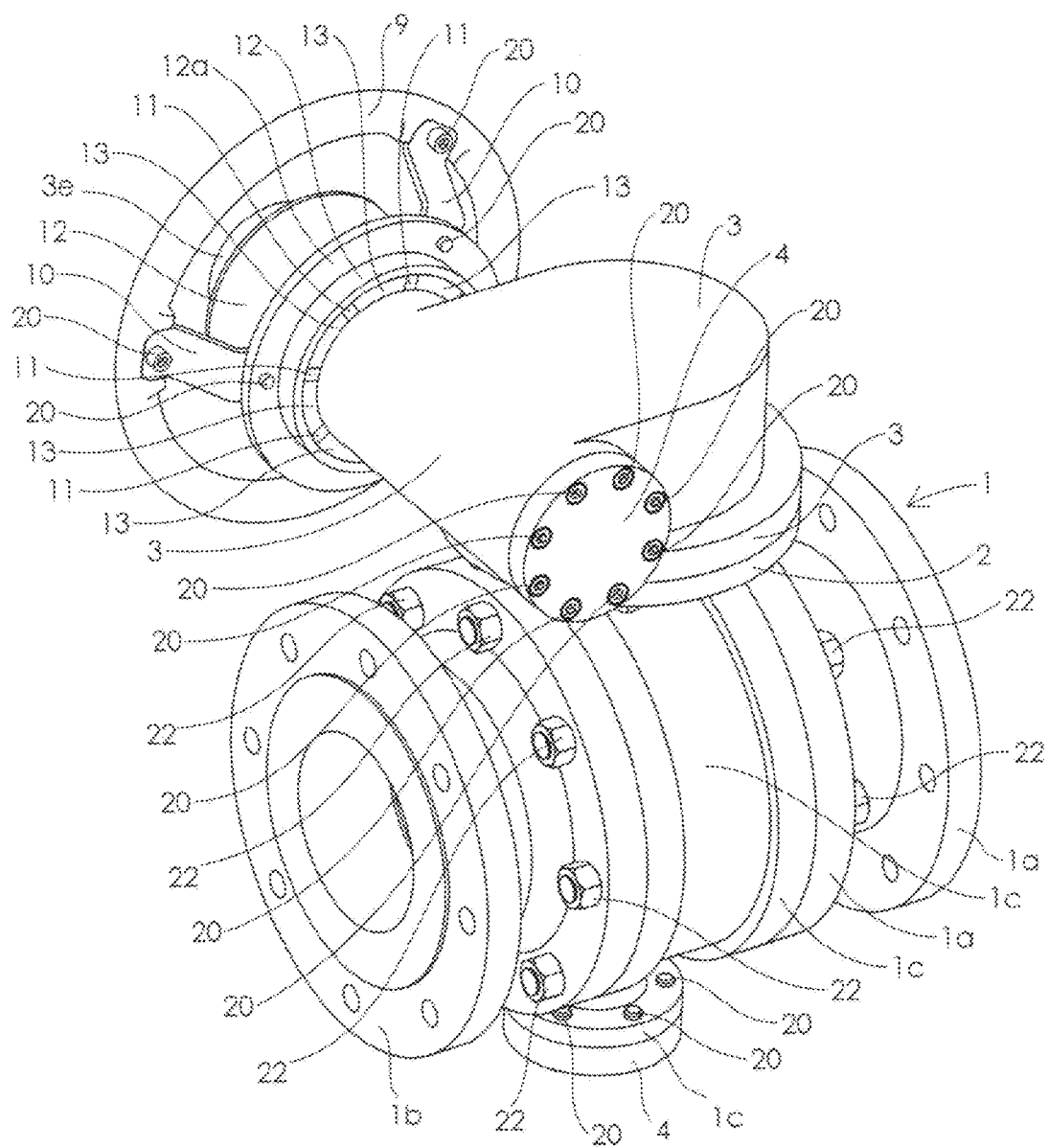
FIG. 3 is a top perspective view of the present invention.

FIG. 3 is a top perspective view of the present invention. This figure shows the driver support 11, which houses the outer magnets 13 (i.e., the outer magnets 13 are housed within the driver support 11). The enclosure 3 provides a leak-free barrier between the outer 13 and inner 15 (not shown) magnets. As shown in this figure, the enclosure 3 (which houses the worm gear 16) is situated between the actuator assembly (which is comprised of the actuator wheel 9 and other magnets 13) and the valve body 1. This is a critical aspect of the present invention.

Note that in the embodiment shown in FIGS. 1-3, the driver base 12 is not physically affixed to the enclosure 3; rather, the magnetic force between the outer 13 and inner 15 magnets keeps the driver base 12 in place. In theory, if enough force were applied, the driver base 12 could be pulled off of the enclosure 3 (and more particularly, the protrusion 3a on the enclosure 3). For this reason, subsequent embodiments include a magnet retainer 23 (see, e.g., FIGS. 10-13).

Figure 4:
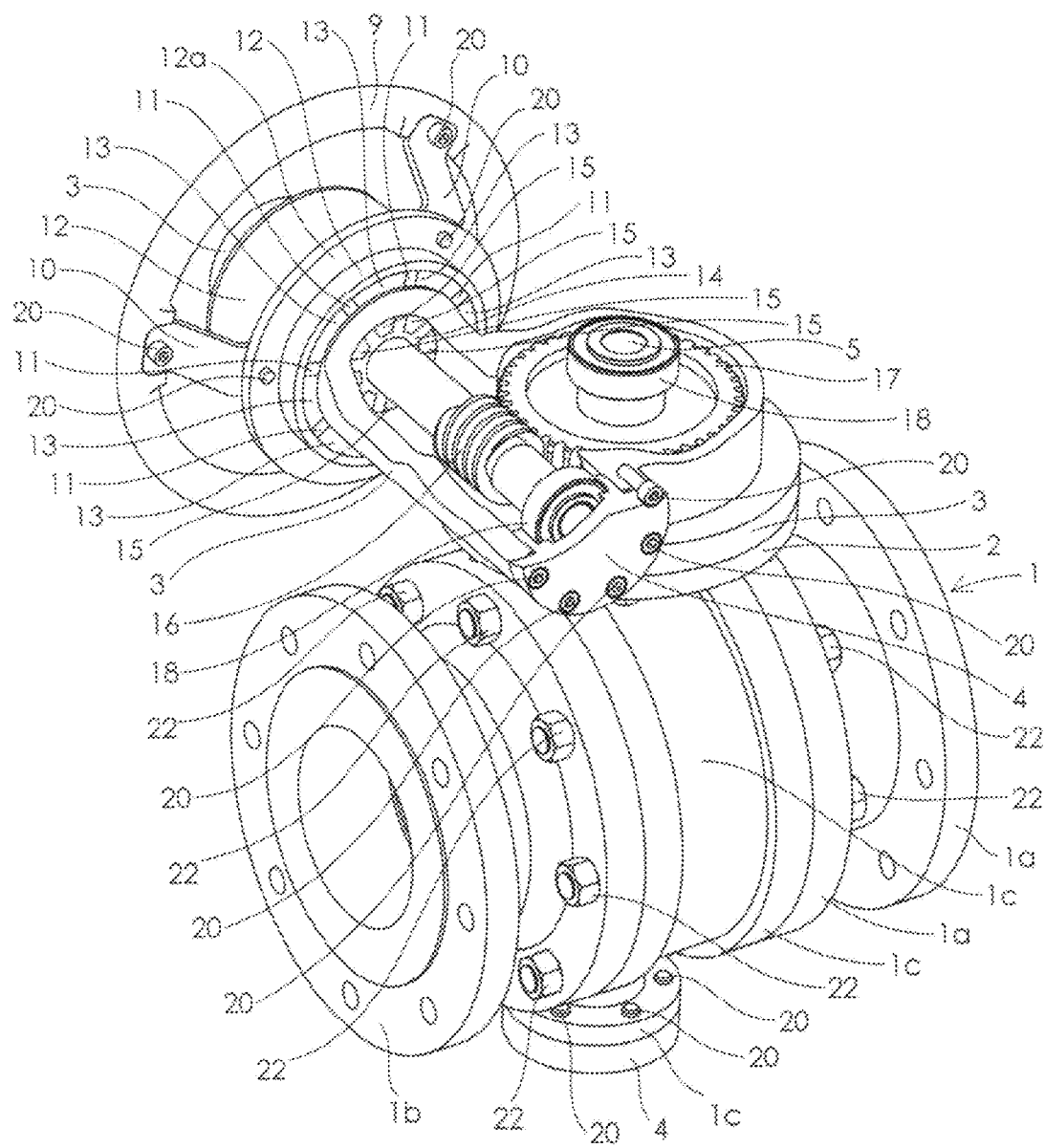
FIG. 4 is a top perspective cutaway view of the present invention.

FIG. 4 is a top perspective cutaway view of the present invention. In this figure, the top part of the enclosure 3 has been cut away to show that the worm gear 16 and pinion gear 17 are situated inside of the enclosure 3. The worm gear 16 interfaces with the pinion gear 17 so that when the worm gear 16 rotates, the pinion gear 17 does as well. This is the gear reduction aspect of the present invention, and it is also here—at the interface between the worm gear and the pinion gear—that the torque is increased. In this context, the term "gear reduction" means that one complete revolution of the worm gear will cause less than a complete revolution of the pinion gear.

Figure 5:
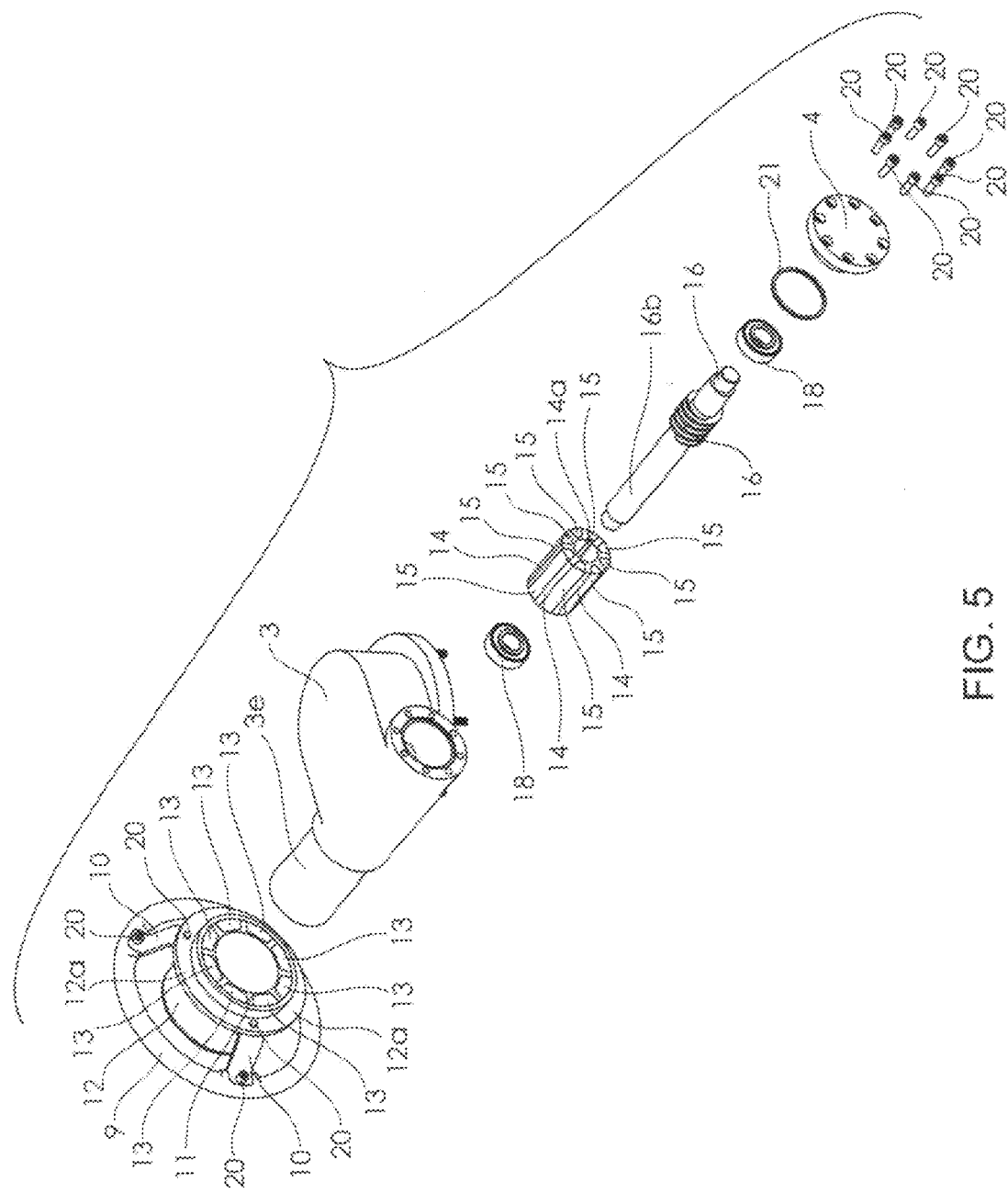
FIG. 5 is an exploded view of the actuator assembly and worm gear assembly.

A ball bearing 18 is preferably situated at both ends of the worm gear 16 (see FIG. 5). The ball bearings 18 allow the shaft of the worm gear 16 to rotate freely within them. Although a ball bearing 18 is shown in the figures, the present invention is not limited to any particular type of bearing. Other bearings (such as roller or journal bearings) may be used as well. One end of the worm gear 16 passes through the follower support 14 and into a first ball bearing 18, as shown more clearly in FIG. 5. The other end of the worm gear 16 passes through a second ball bearing 18 and is inserted into the cap 4. The shaft of the worm gear 16 rotates with the follower support 14 because the follower support preferably comprises a key slot 14a into which a key 16b (see FIGS. 8 and 9) on the worm gear shaft fits. The gasket 21 provides a static seal between the cap 4 and the enclosure 3.

FIG. 5 is an exploded view of the actuator assembly and worm gear assembly. In this embodiment, the outer magnets 13 are situated within a driver support 11, which in turn is situated within the driver base 12. The inner magnets 15 are situated within a follower support 14. When the invention is fully assembled, the follower support 14 is inside of that portion 3e of the enclosure 3 that lies inside of the driver support 11. In other words, a portion of the enclosure 3 is situated between the inner and outer magnets 15, 13. This portion 3e of the enclosure 3 acts as a physical barrier between the inner and outer magnets 15, 13. To actuate the valve, the actuator wheel 9 is turned (either manually or via a motor), thereby causing the driver base 12 to turn as well. The driver support 11 is fixedly attached to the driver base 12, for example but not by way of limitation, with glue or by welding (see also FIG. 6, which shows where the driver support 11 and driver base 12 come into contact with one another). When the driver support 11 rotates, the magnetic counting between the inner and outer magnets 15, 13 causes the follower support 14 to rotate as well.

Figure 6:
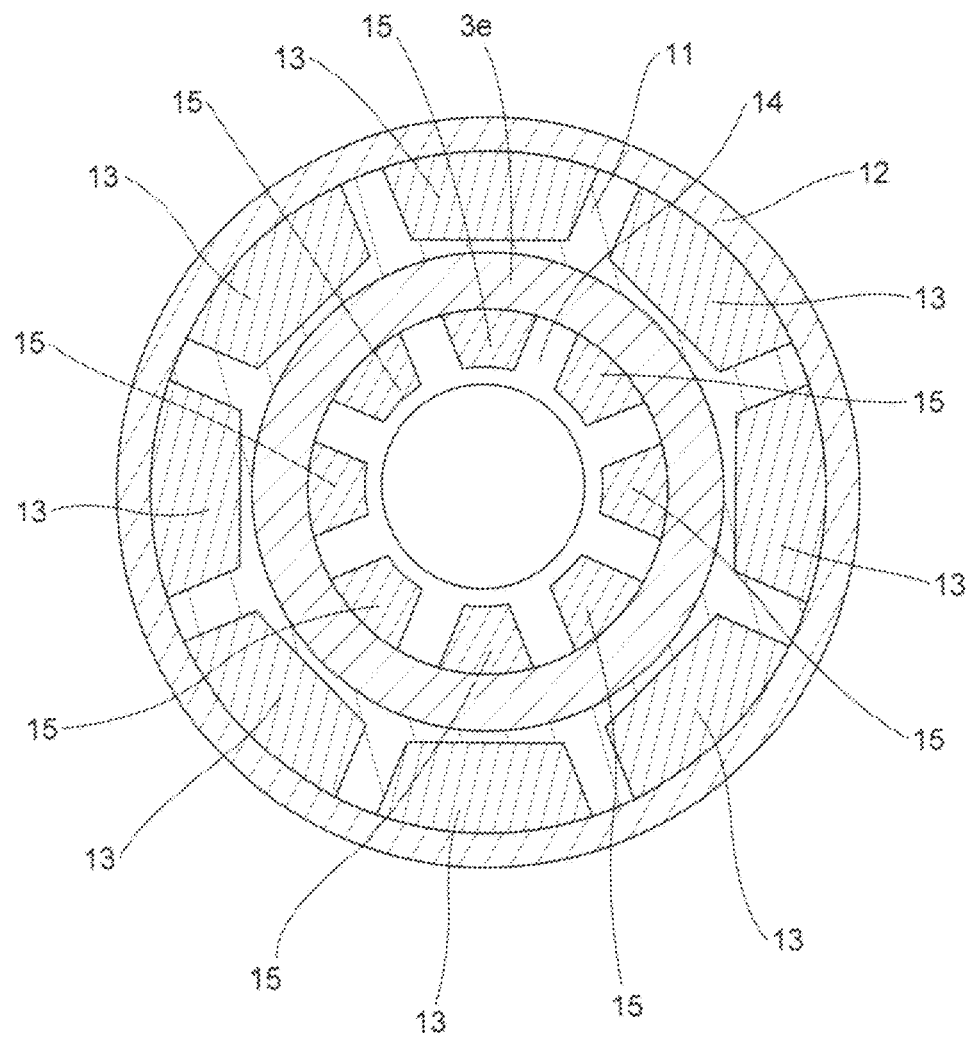
FIG. 6 is a section view of the magnetic actuator assembly.

FIG. 6 is a section view of the magnetic actuator assembly. This figure shows the inner and outer magnets 15, 13, as well as the driver and follower supports 11, 14, in relation to one another. This figure also snows that a portion 3e of the enclosure 3 is situated between the driver support 11 and the follower support 14.

Figure 7:
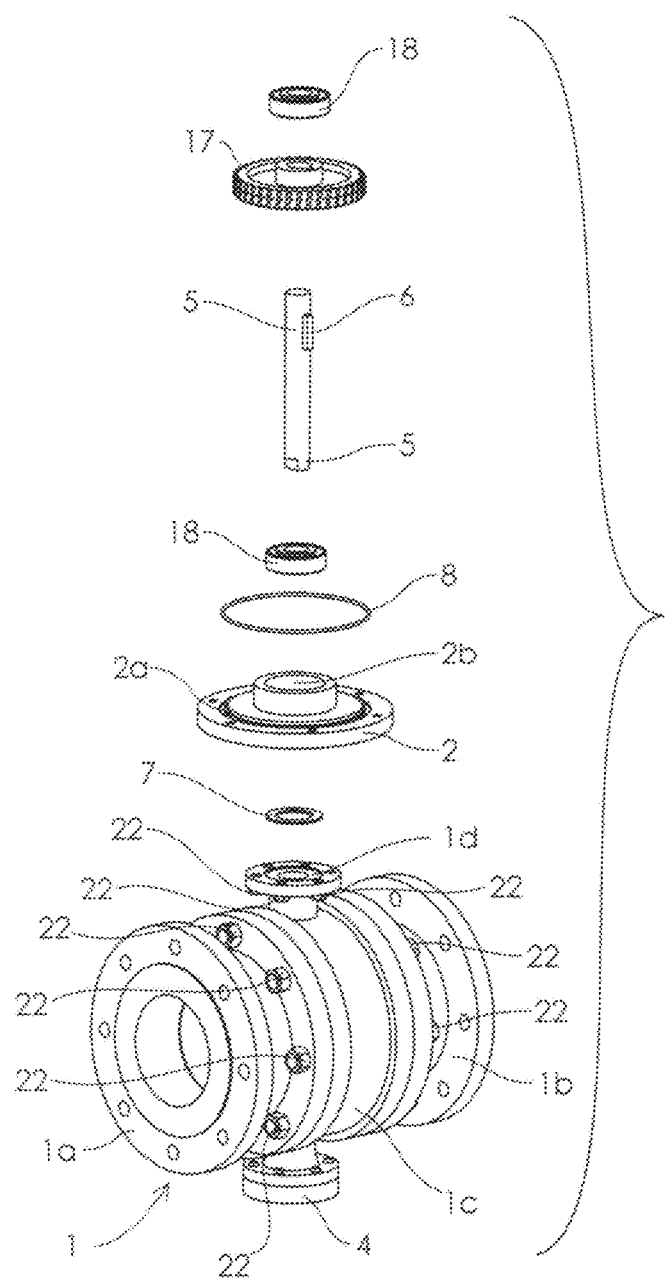
FIG. 7 is a perspective view of the valve body and an exploded view of the pinion gear assembly.

FIG. 7 is a perspective view of the valve body and an exploded view of the pinion gear assembly. As shown in this figure, a ball bearing 18 is preferably situated on either side of the pinion gear 17. A shaft 5 is inserted into and through the center of the pinion gear 17 and also through the ball bearings 18. The shaft 5 comprises a shaft key 6, which fits into a key slot (not labeled but shown in FIG. 10) in both the shaft 4 and the pinion gear 17. Because of the shaft key 6, the shaft 5 rotates when the pinion gear 17 rotates (i.e., at a much higher torque than the actuator wheel because of the gear reduction). An O-ring 8 preferably fits into a seal groove 2a in the adapter plate 2 to provide a seal between the enclosure 3 and adapter plate 2 (see FIG. 9). A seal 7 preferably fits onto a recess 1d in the top of the valve body 1 to provide a seal between the valve body 1 and adapter plate 2. Note that the adapter plate 2 preferably comprises a bearing holder 2b into which one of the two ball bearings 18 fits. As noted above, the present invention is not limited to any particular type of bearing, and any suitable bearing may be used.

Figure 8:
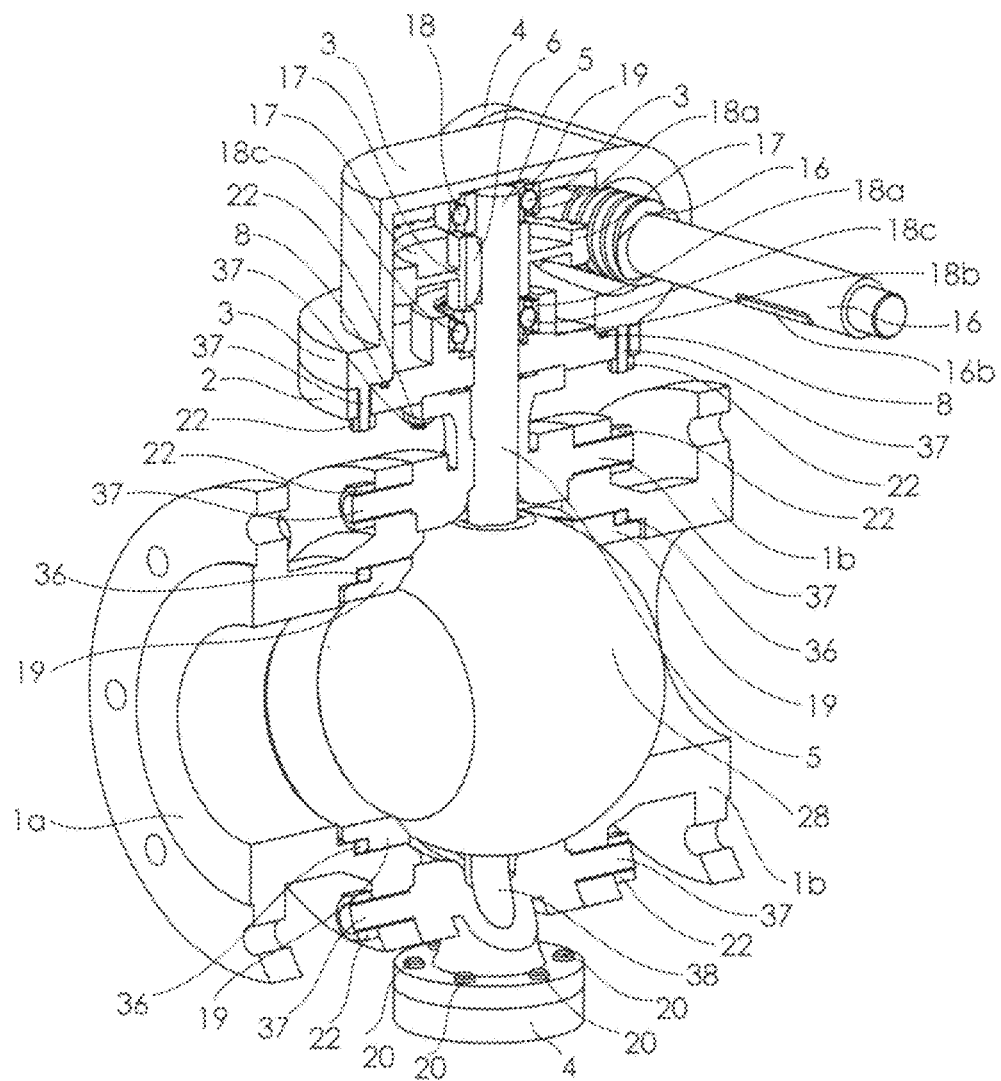
FIG. 8 is a cutaway view of the present invention with the ball in an open position.

FIG. 8 is a cutaway view of the present invention with the ball in an open position. This figure shows the outer ring 18a, inner ring 18b and ball 18c of the ball bearings 18 on either side of the pinion gear 17. The ball bearing 18 is shown in greater detail in FIG. 24. The ball bearings 18 on either end of the worm gear 16 are not visible in this figure. The key 16b on the worm gear 16 that fits into the key slot 14a of the follower support 14 is also shown. FIGS. 8 and 25 also show how the shaft 5 fits into the ball 28; note that the shaft 4 is shaped so that when it is inserted into the ball 5, the ball 28 rotates when the shaft 5 rotates. The purpose of the ball seat 19 is to seal out fluid between the ball 28 and the valve body 1a, 1b. A rubber spring gasket 36 surrounds each seat 19 (one on top of the ball and one on the bottom of the ball) and provides a seal between the valve body 1a, 1b and the seat 19. The rubber spring gasket 36 also provides positive pressure between the seat 19 and the ball 28.

Figure 9:
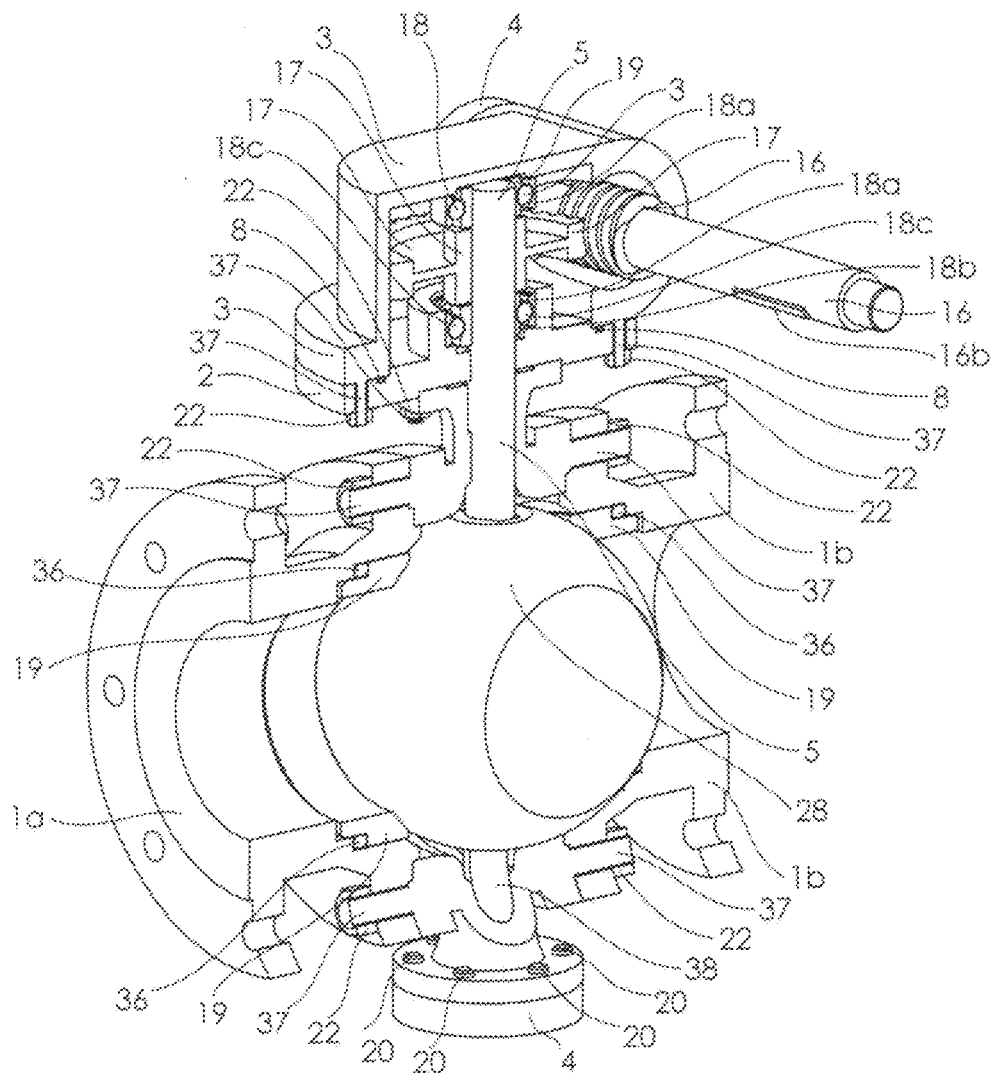
FIG. 9 is a cutaway view of the present invention with the ball in a closed position.

FIG. 9 is a cutaway view of the present invention with the ball in a closed position. This figure shows all of the same components as in FIG. 8.

Figure 10:
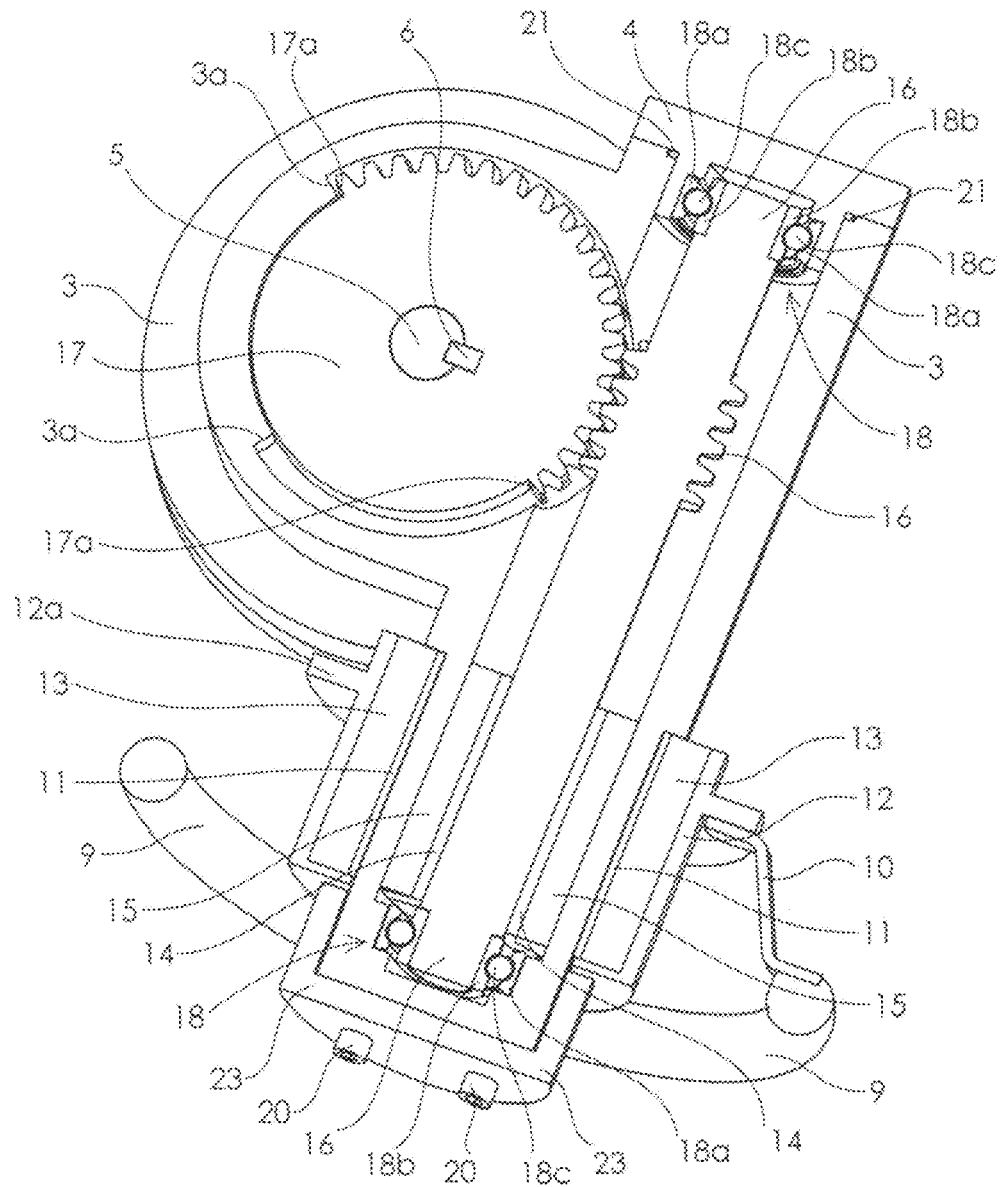
FIG. 10 is a section view of the worm and pinion gear assemblies with the valve in an open position.

FIG. 10 is a section view of the worm and portion gear assemblies with the valve in an open position. As shown in this figure, the enclosure 3 preferably comprises two positive stops 3a, which prevents the pinion gear 17 from over-rotating. The outer-most teeth of the pinion gear 17 act as positive stops 17a in that they prevent the pinion gear 17 from continuing to rotate when they hit the positive stops 3a of the enclosure 3.

Figure 11:
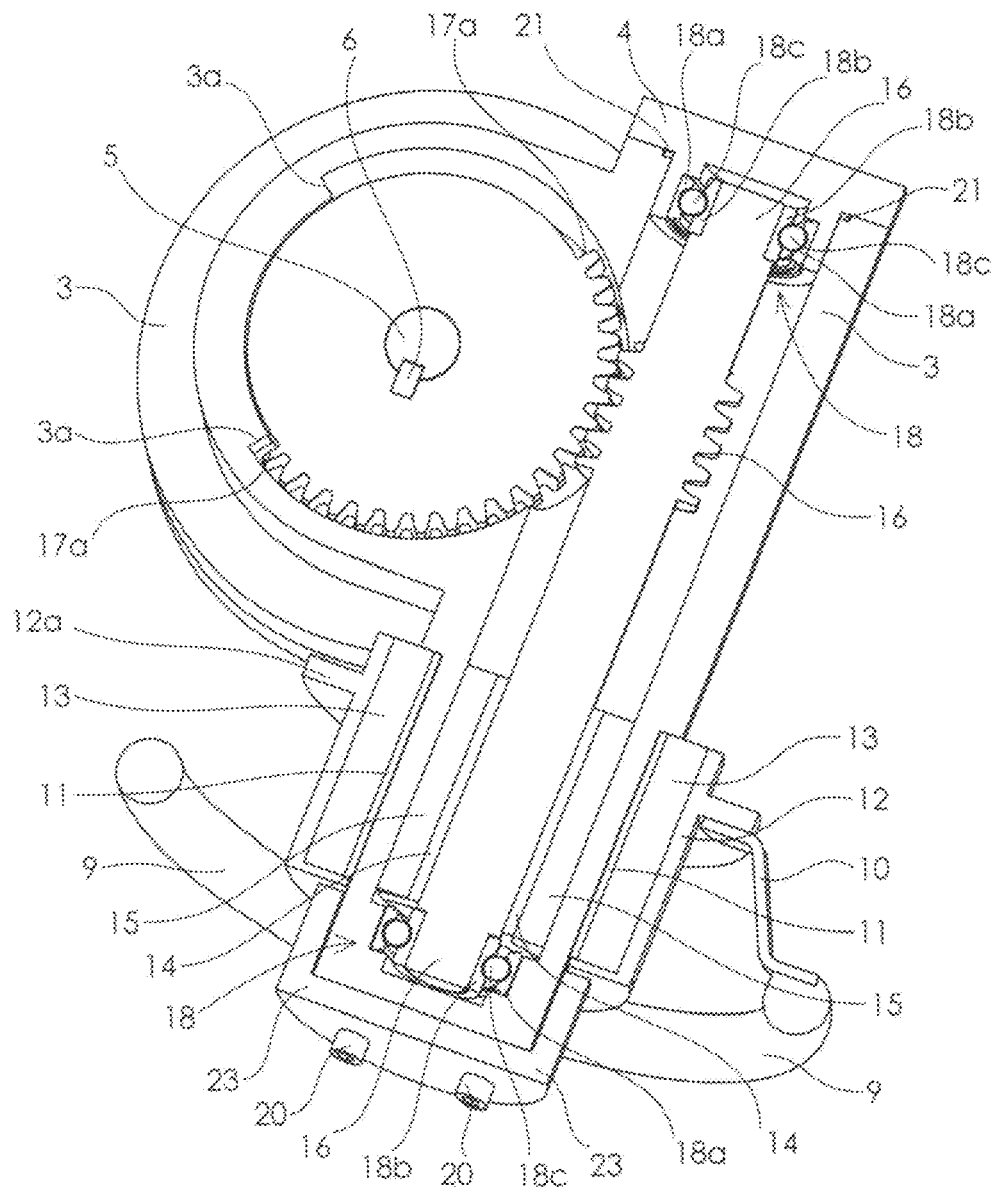
FIG. 11 is a section view of the worm and pinion gear assemblies with the valve in a closed position.

FIG. 11 is a section view of the worm and pinion gear assemblies with the valve in a closed position. This figure shows all of the same components as in FIG. 10.

Figure 12:
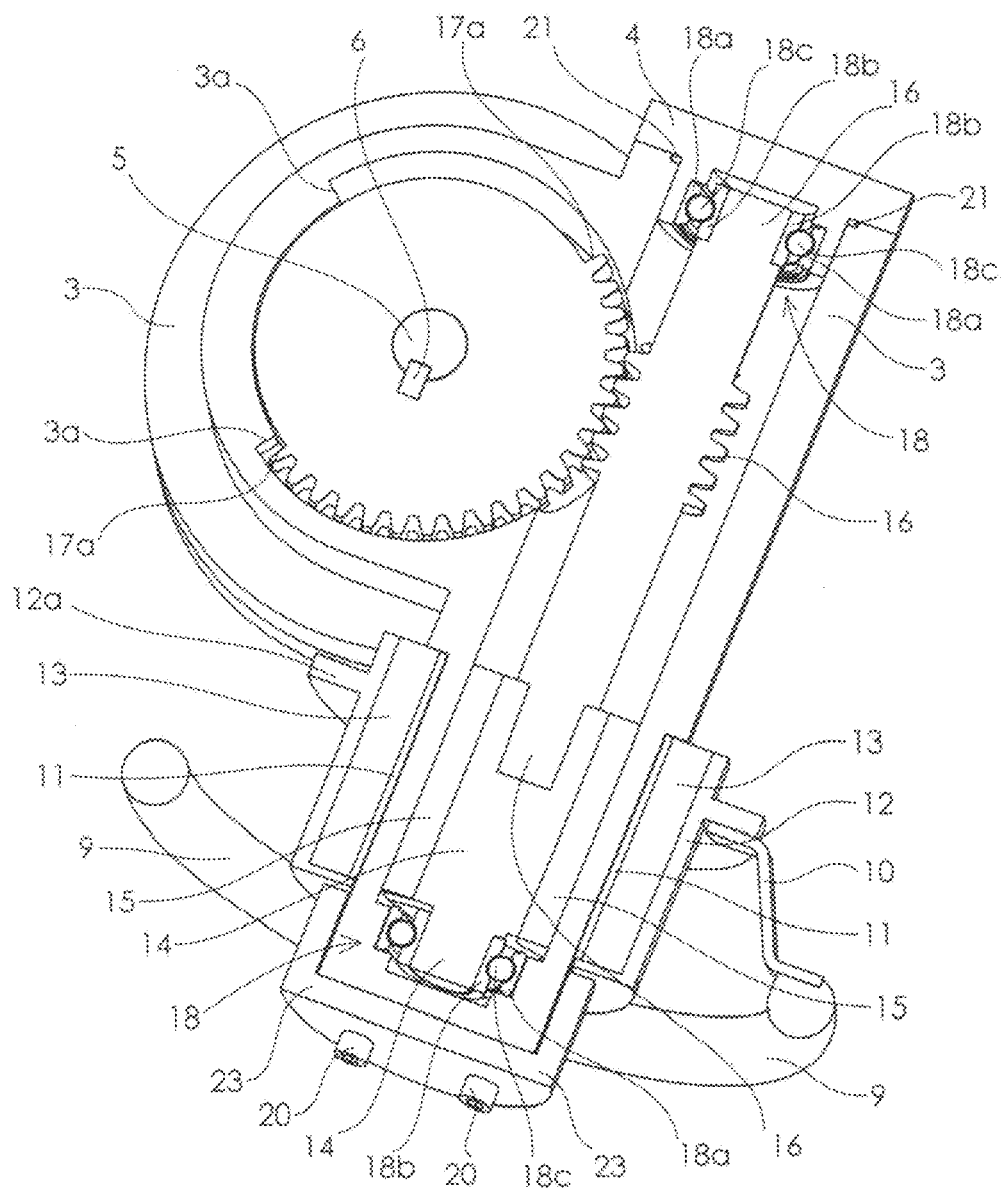
FIG. 12 is a section view of the worm and pinion gear assemblies shown with the follower support interfacing with the bearing instead of the worm gear shaft.

FIG. 12 is a section view of the worm and pinion gear assemblies shown with the follower support 14 (rather than the worm gear shaft 16) interfacing with the bearing 18. In this alternate embodiment, rather than the shaft of the worm gear 16 extending all of the way into the first ball bearing 18 on the other side of the follower support 14 (see FIG. 5), the worm gear shaft 16 terminates inside of the follower support 14, and the follower support 14 extends into the ball bearing 18. Note that in either case (the embodiment shown in FIG. 11 or the embodiment shown in FIG. 12), the worm gear shaft 16 rotates with the follower support 14.

Figure 13:
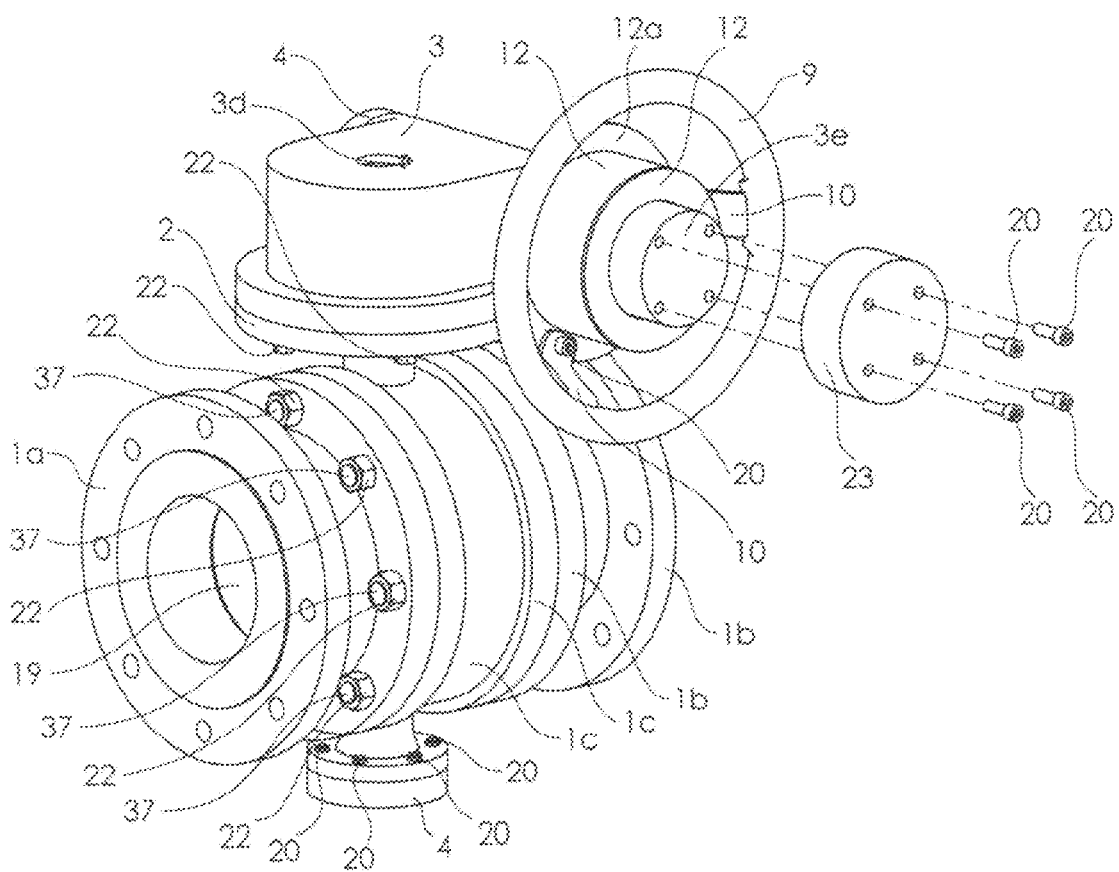
FIG. 13 is a perspective view of the present invention shown with a magnet retainer and a position indication window.

FIG. 13 is a perspective view of the present invention shown with a magnet retainer and a position indication window. In this alternate embodiment, an optional magnet retainer 23 (also shown in FIGS. 11-12) is situated over the end of the enclosure 3e (like a hat) and bolted in it. The function of the magnet retainer 23 is to prevent the driver base 12 from being pulled off of the enclosure 3e (i.e., to prevent the inner and outer magnets 15, 13 from decoupling). Note that the outside diameter of the magnet retainer 23 is preferably slightly greater than the inside diameter of the hole in the driver base 12 through which the enclosure 3e protrudes. The position indicator window 3d is discussed more fully below in connection with FIG. 14.

Figure 14:
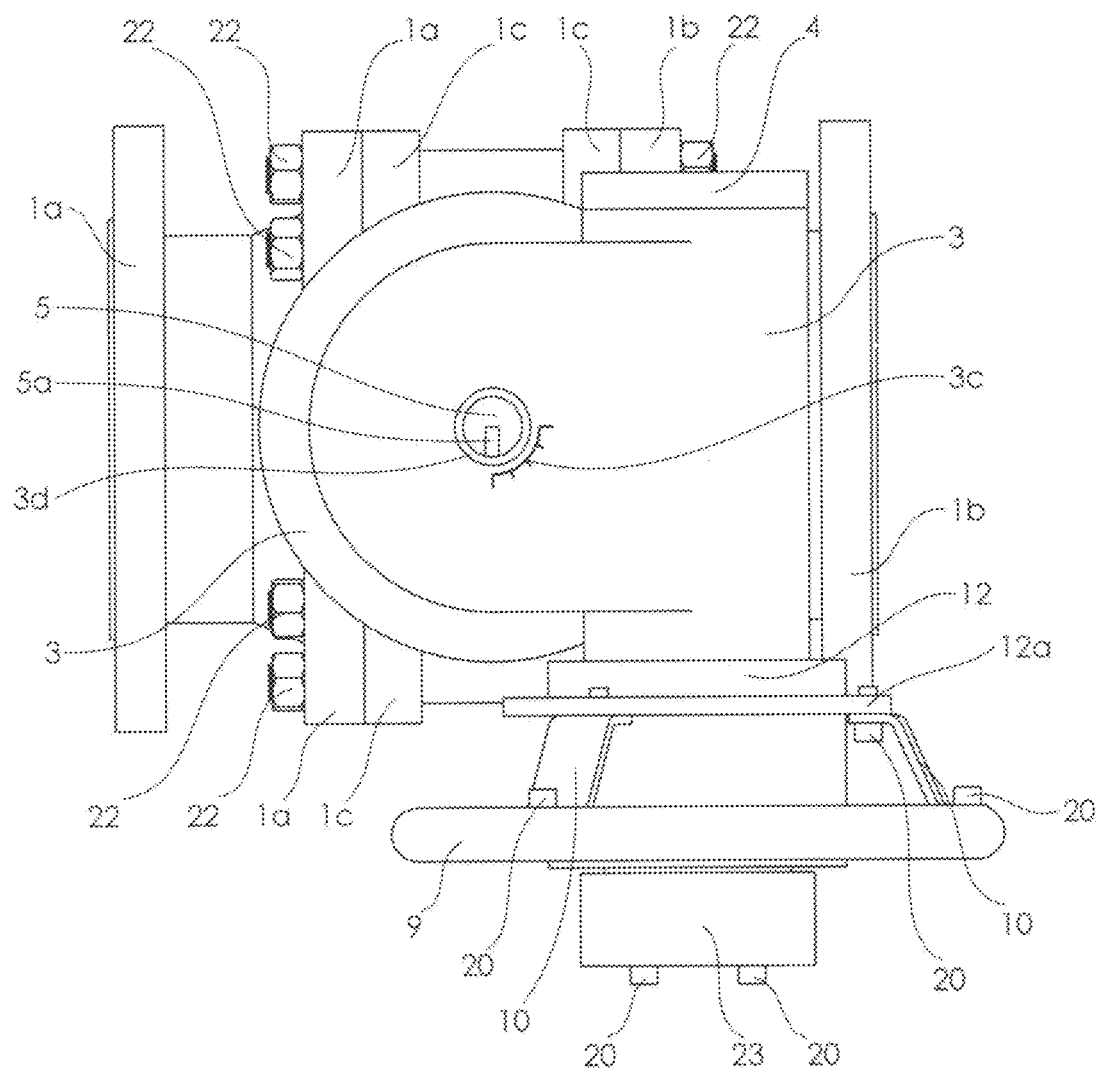
FIG. 14 is a top view of the present invention shown with a magnet retainer and a position indication window.

FIG. 14 is a top vice of the present invention shown with a magnet retainer and a position indication window. In this embodiment, the top surface of the enclosure 3 comprises a window 3d and a position gauge 3c. The window 3d is preferably comprised of clear glass rated to the same pressure as the enclosure 3. The top of the shaft 5 is clearly visible through the window 3d. The top of the shaft 5 comprises a marker 5a that indicates the rotational position of the shaft 5 relative to the position gauge 3c. The present invention is not limited to any particular type of marker. For example, the marker could be a slot in the top of the shaft, it could be a sticker, or it could be painted onto the top of the shaft.

Figure 15:
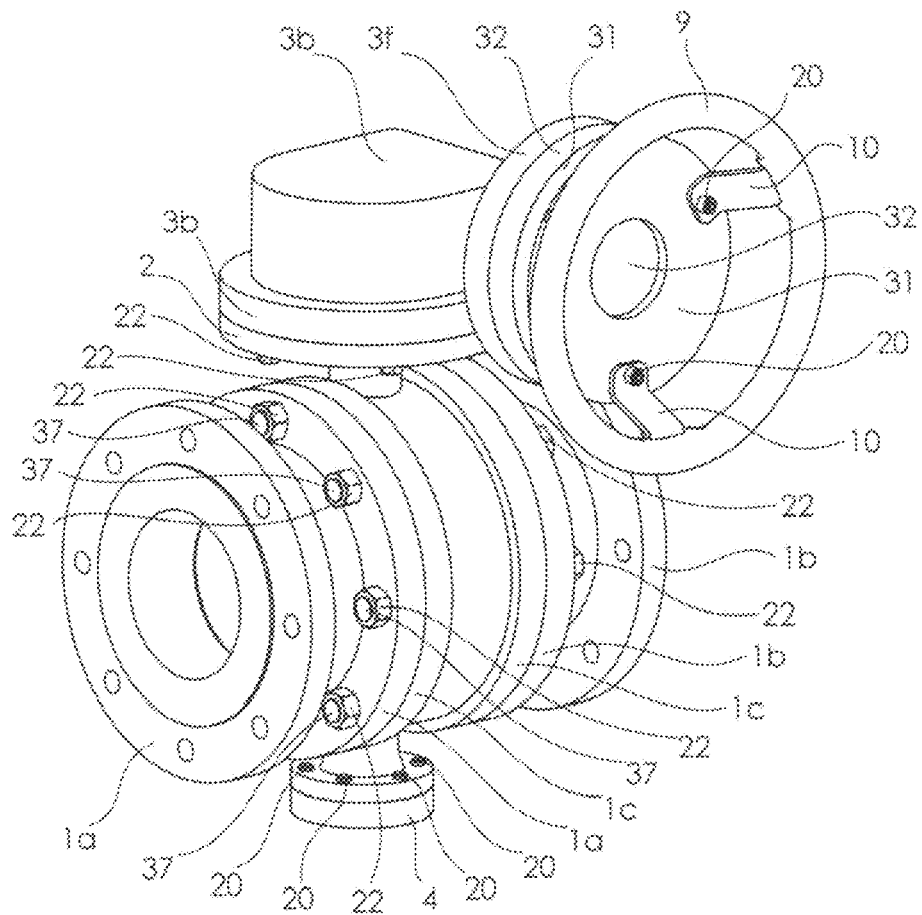
FIG. 15 is a perspective view of the present invention shown with a radial magnet array.

FIGS. 15-19 show an alternate embodiment of the present invention in which the inner and outer magnets are arranged in a radial array rather than the cylindrical array shown in FIG. 6. FIG. 15 is a perspective view of the present invention shown with a radial magnet array. The differences between this embodiment and the cylindrical magnet array embodiments previously shown and described are: (1) the enclosure 3 is replaced with a radial enclosure 3b; (2) the driver support 11 and follower support 14 are replaced with a radial driver support 33 and a radial follower support 34; and (3) rather than the enclosure 3e being situated between the driver support 11 and the follower support 14, the radial cap 32 (which attaches to the radial enclosure 3b) is situated between the radial driver support 33 and the radial follower support 34. In addition, the bearings 18 are held by the enclosure 3b and radial cap 32 rather than the cap 4 and enclosure 3e.

Figure 16:
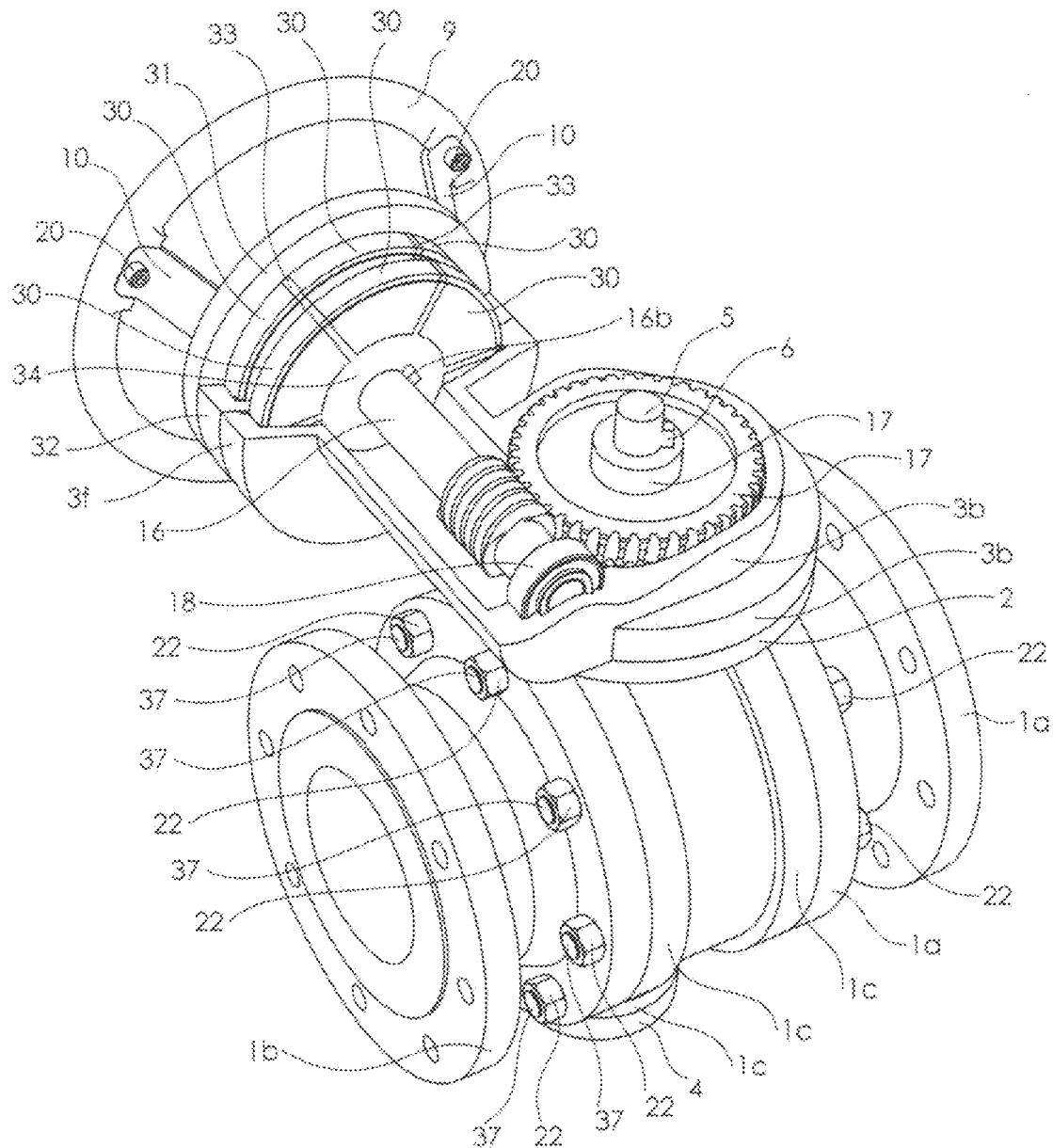
FIG. 16 is a top perspective cutaway view of the present invention shown with a radial magnet array.

FIG. 16 is a top perspective cutaway view of the present invention shown with a radial magnet array. In this embodiment, a first set of radial magnets 30 is arranged within a radial driver support 33 (see also FIG. 17). A radial cap 32 is situated between the first set of radial magnets 30 in the radial driver support 33 and a second set of radial magnets 30 arranged within a radial follower support 34 and acts as a physical barrier between the first and second sets of radial magnets. The shaft of the worm gear 16 comprises a key 16b that fits into a key slot 34a in the radial follower support 34 so that the worm gear 16 rotates along with the second set of radial magnets 30. The actuator spokes 10 are screwed (not shown) onto the radial driver cap 31, which is fixedly attached (for example, with glue or welding) to the radial driver support 33, which carries the radial magnets 30. In this manner, when the actuator wheel 10 rotates, the radial magnets 30 rotate as well.

Figure 17:
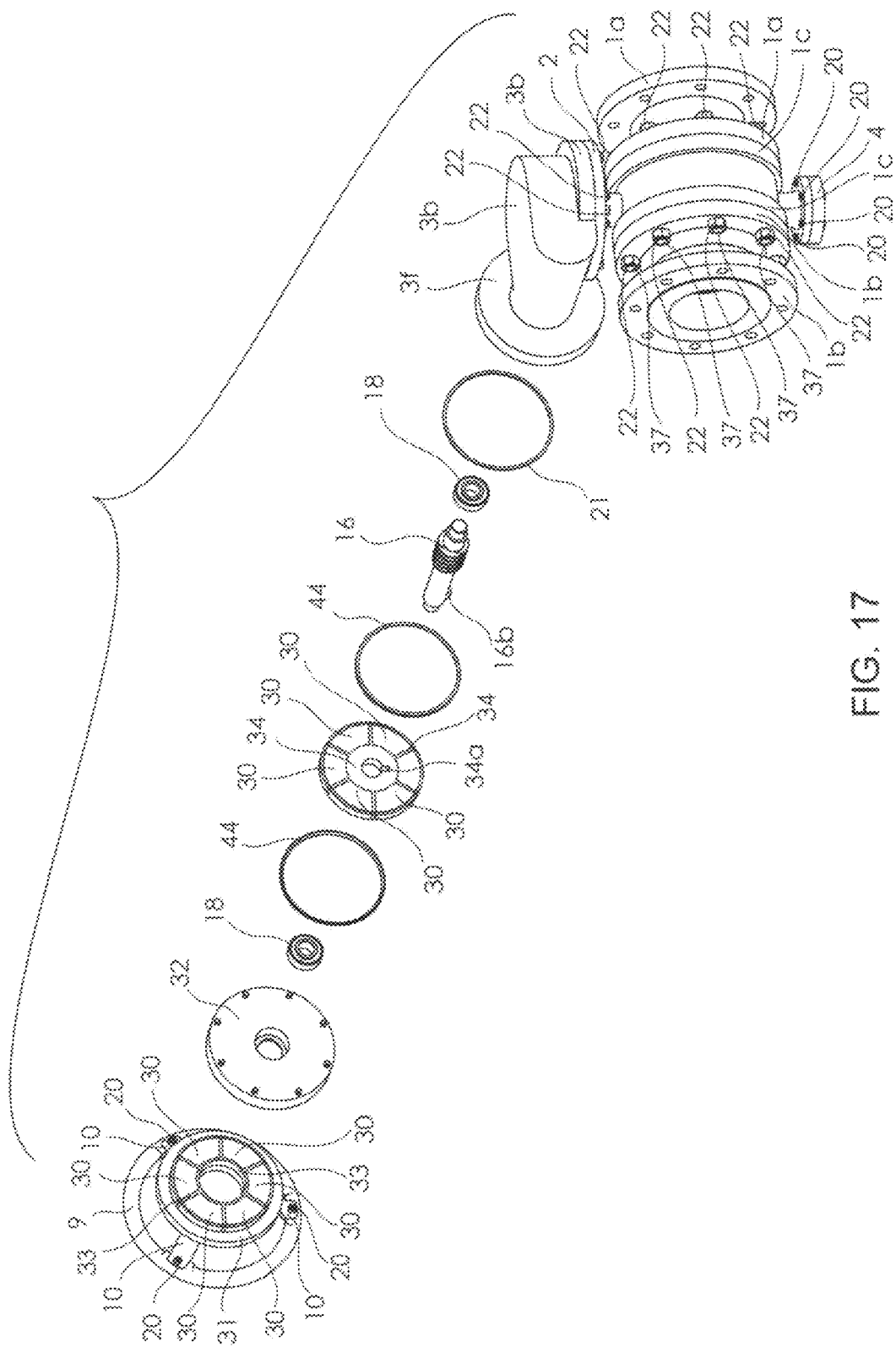
FIG. 17 is an exploded view of the present invention shown with a radial magnet array.

FIG. 17 is an exploded view of the present invention shown with a radial magnet array. The present invention is not limited to any particular configuration of magnets as long as there are two sets of magnets with a physical barrier between them. In the radial magnet array embodiment (shown in FIGS. 15-19), the radial cap 32 acts as the physical barrier between the radial driver support 33 and the radial follower support 34. The radial follower support 34 fits inside of the radial enclosure 3b, and the radial cap 32 is bolted to the radial enclosure 3b. (Note that the radial enclosure flange 3f does not exist in the cylindrical magnet embodiment; instead, the cylindrical magnet embodiment has an enclosure portion 3e that extends through the driver support 11 (see FIG. 5).) In this manner, a leak-free seal is provided between the radial follower support 34 and the radial cap 32 (in other words, the radial cap 32 becomes part of the radial enclosure 3b).

Figure 28:
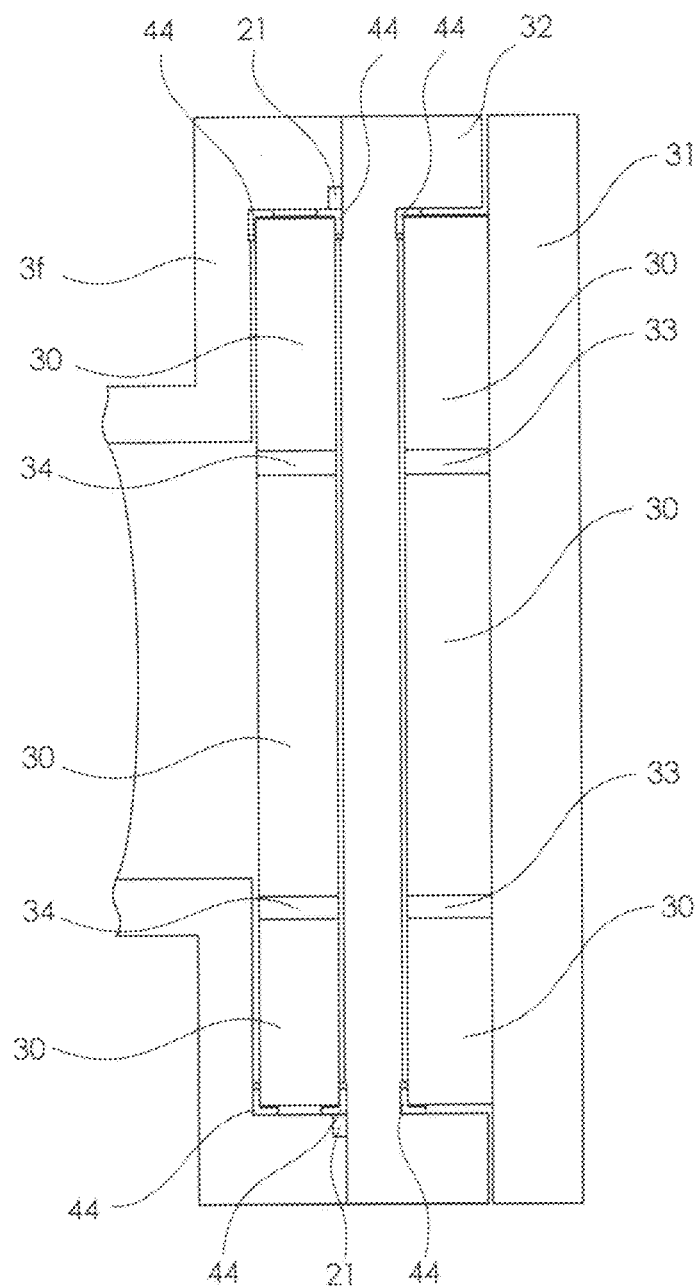
FIG. 28 is a section view of the radial magnet embodiment showing the journal bearings and gasket.

FIG. 17 also shows a journal bearing 44 between the radial magnets 30 and the flange 3f of the radial enclosure and between the radial magnets 30 and the radial cap 32. A gasket 21 is preferably situated between the flange 3f of the radial enclosure and the radial cap 32. FIG. 28 is a section view of the radial magnet embodiment (shown in FIGS. 15-19) showing the orientation of the journal bearings 44 and gasket 21 relative to the flange 3f of the radial enclosure, the radial magnets 30, the radial driver cap 31, the radial cap 32, and the radial driver support 33.

Figure 18:
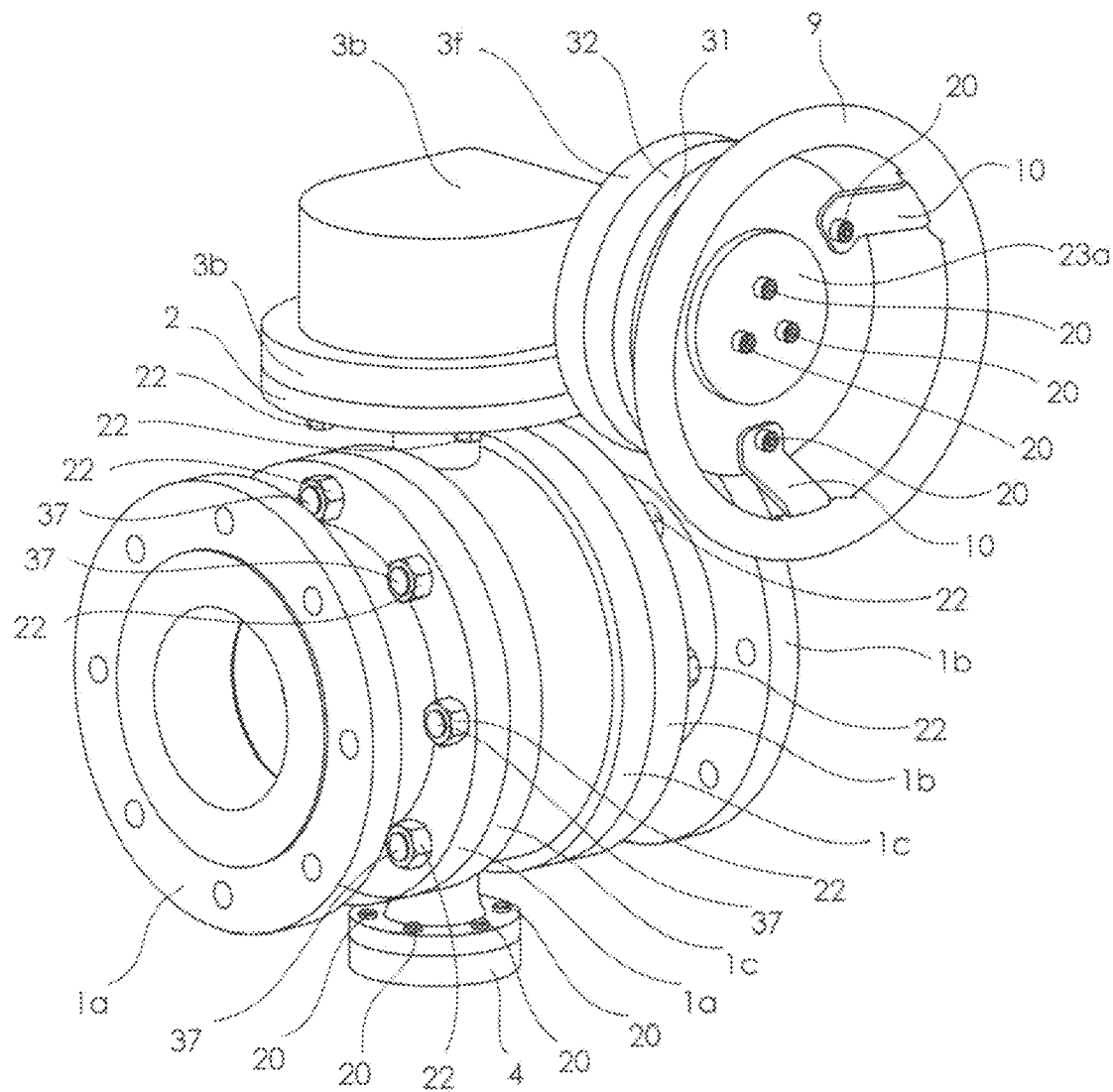
FIG. 18 is a perspective view of the present invention shown with a radial magnet array and a magnet retainer.
Figure 19:
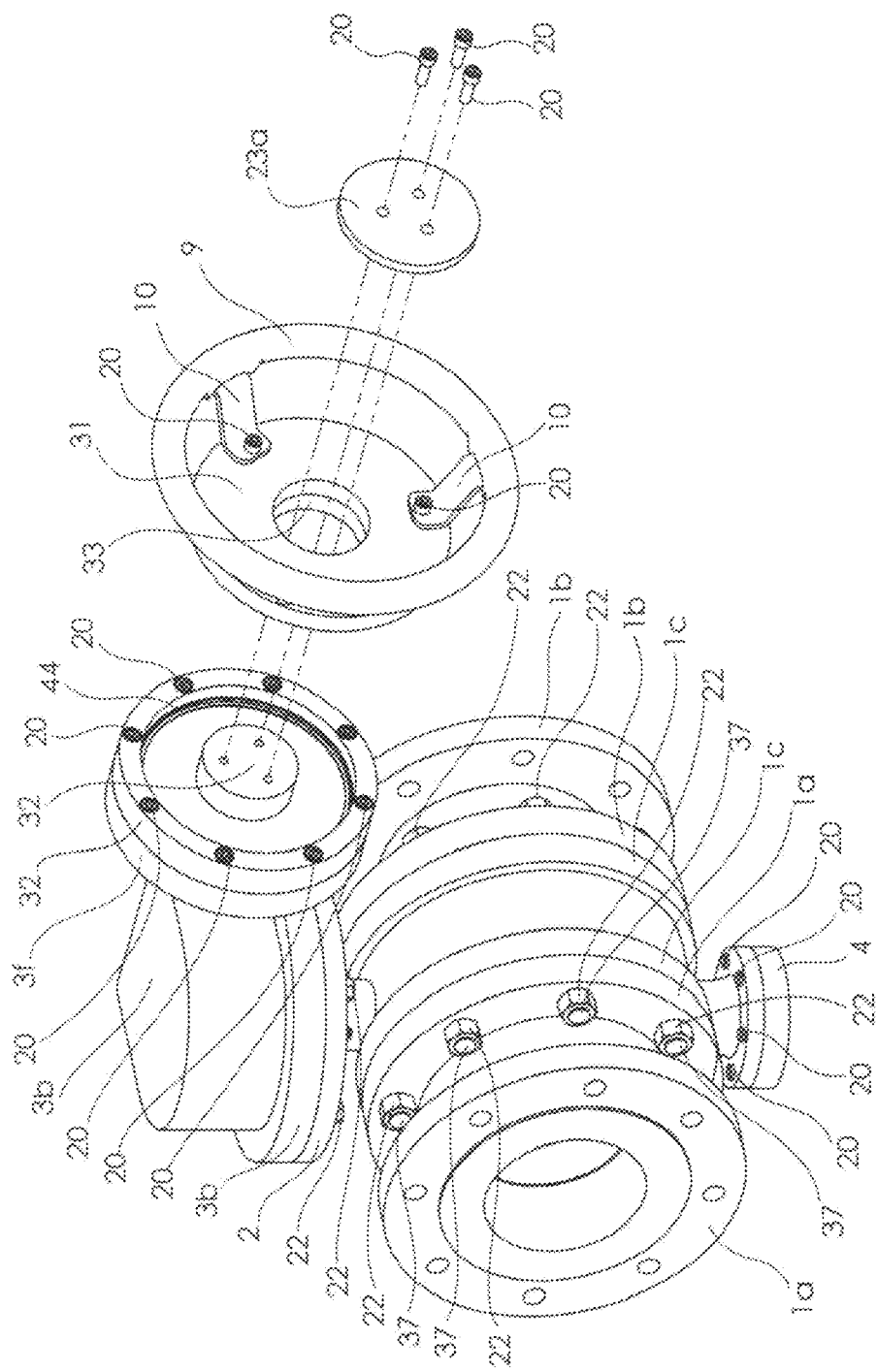
FIG. 19 is an exploded view of the present invention shown with a radial magnet array and a magnet retainer.

FIG. 18 is a perspective view of the present invention shown with a radial magnet array and a magnet retainer. FIG. 19 is an exploded view of the present invention shown with a radial magnet array and a magnet retainer. As shown in these figures, the magnet retainer 23a takes the form of a plate (affixed to the radial cap 32) in this embodiment rather than the hat-shaped configuration of the magnet retainer shown in FIGS. 10-13. This is because there is no enclosure portion 3e protruding through the driver base 12, as in previous embodiments. The magnet retainer 23a serves the same purpose as previously described in connection with the magnet retainer 23, that is, to prevent the radial driver cap 31 from being pulled off of the radial cap 32 (i.e., to prevent the magnets in the radial driver support 33 from being decoupled from the magnets 30 in the radial follower support 34). Without the magnet retainer 23a, the radial driver cap 31 is held to the radial cap 32 by the magnetic force between the magnets 30 in the radial driver support 33 and the magnets 30 in the radial follower support 34.

Figure 20:
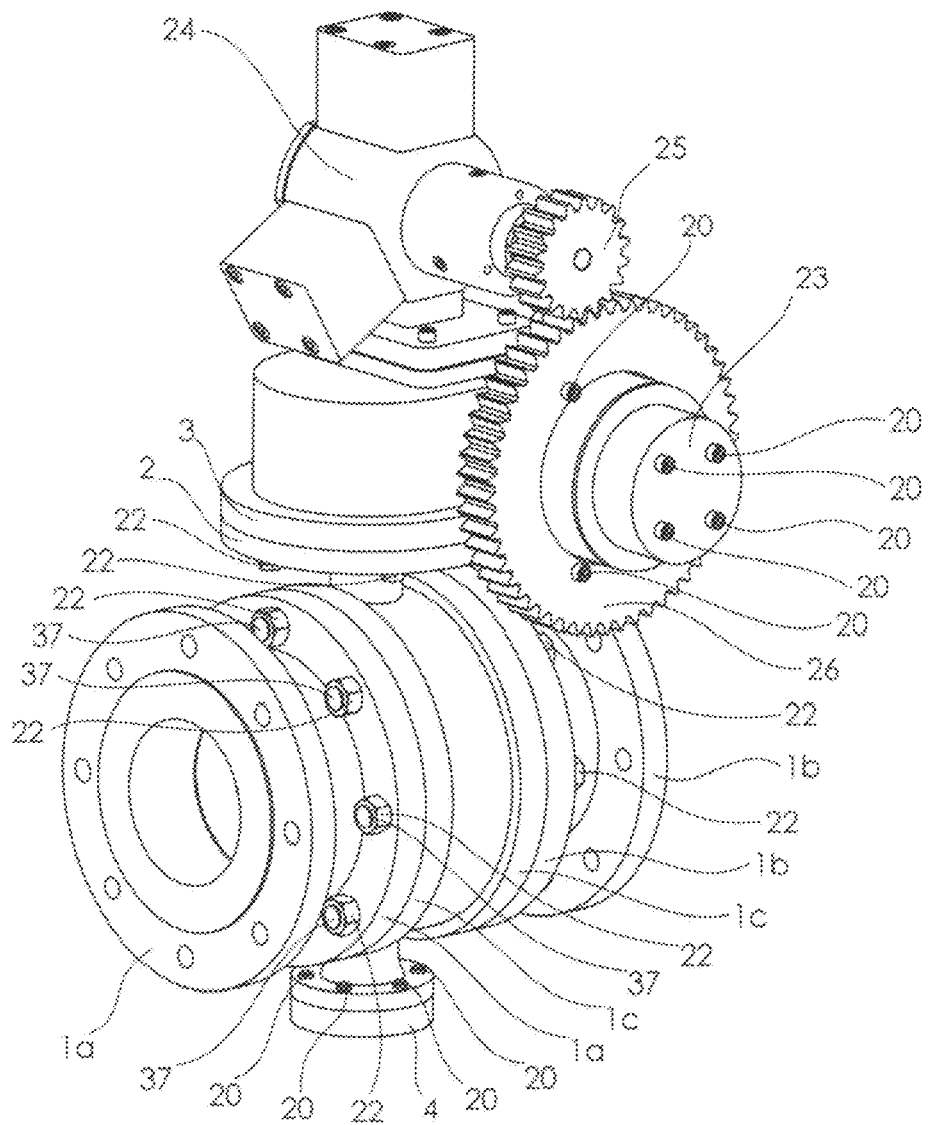
FIG. 20 is a perspective view of the present invention shown with a motor actuator.

FIG. 20 is a perspective view of the present invention shown with a motor actuator. As noted above, the actuator wheel 9 may be rotated manually or by a motor. In this embodiment, a pneumatic motor 24 drives a motor drive gear 25, which in turn drives a motor ring gear 26. Although a pneumatic motor is shown in this figure, an electric motor may also be used. (Note that the embodiment shown in this figure is the cylindrical magnet array, not the radial magnet array.)

Figure 21:
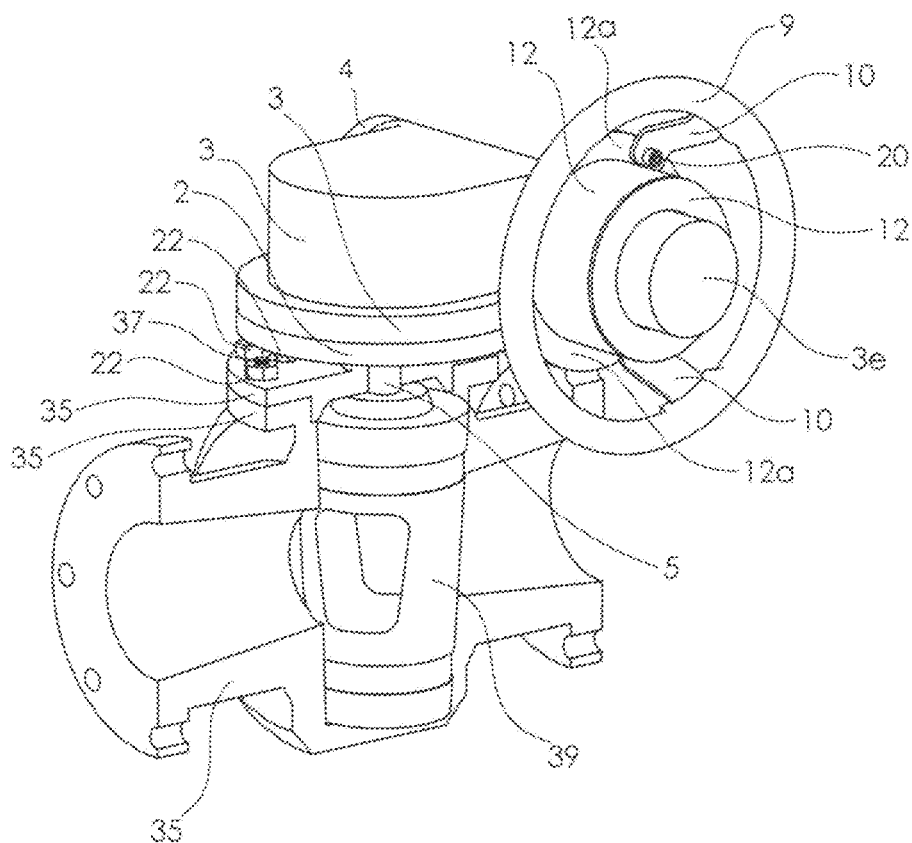
FIG. 21 is a perspective cutaway view of the present invention shown with a plug valve.

FIG. 21 is a perspective cutaway view of the present invention shown with a plug valve. As noted above, the present invention is not limited, to any particular type of rotary valve. In this embodiment, the shaft 5 that extends through the center of the pinion gear 17 and rotates with the pinion gear 17 turns the plug 39 in lieu of the ball 28 shown in previous figures. In this embodiment, the plug valve body 35 replaces the ball valve body 1 described in previous embodiments.

Figure 22:
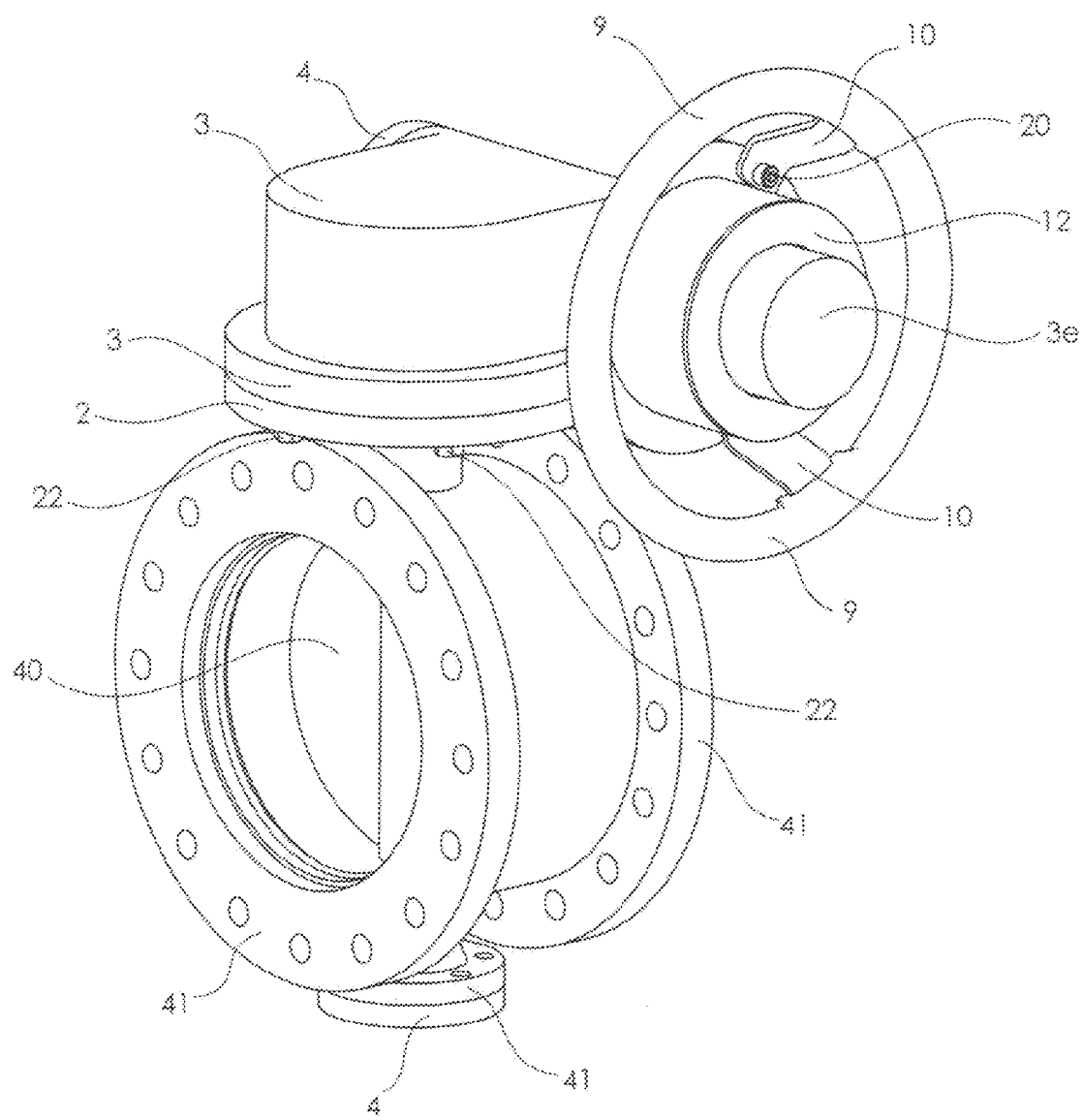
FIG. 22 is a perspective cutaway view of the present invention shown with a butterfly valve.

FIG. 22 is a perspective cutaway view of the present invention shown with a butterfly valve. In this embodiment, the shaft 5 that extends through the center of the pinion gear 17 and rotates with the pinion gear 17 turns the butterfly 40 in lieu of the ball 28 or plug 30 shown in previous figures. In this embodiment, the butterfly valve body 41 replaces the ball valve body 1 described in previous embodiments.

Figure 23:
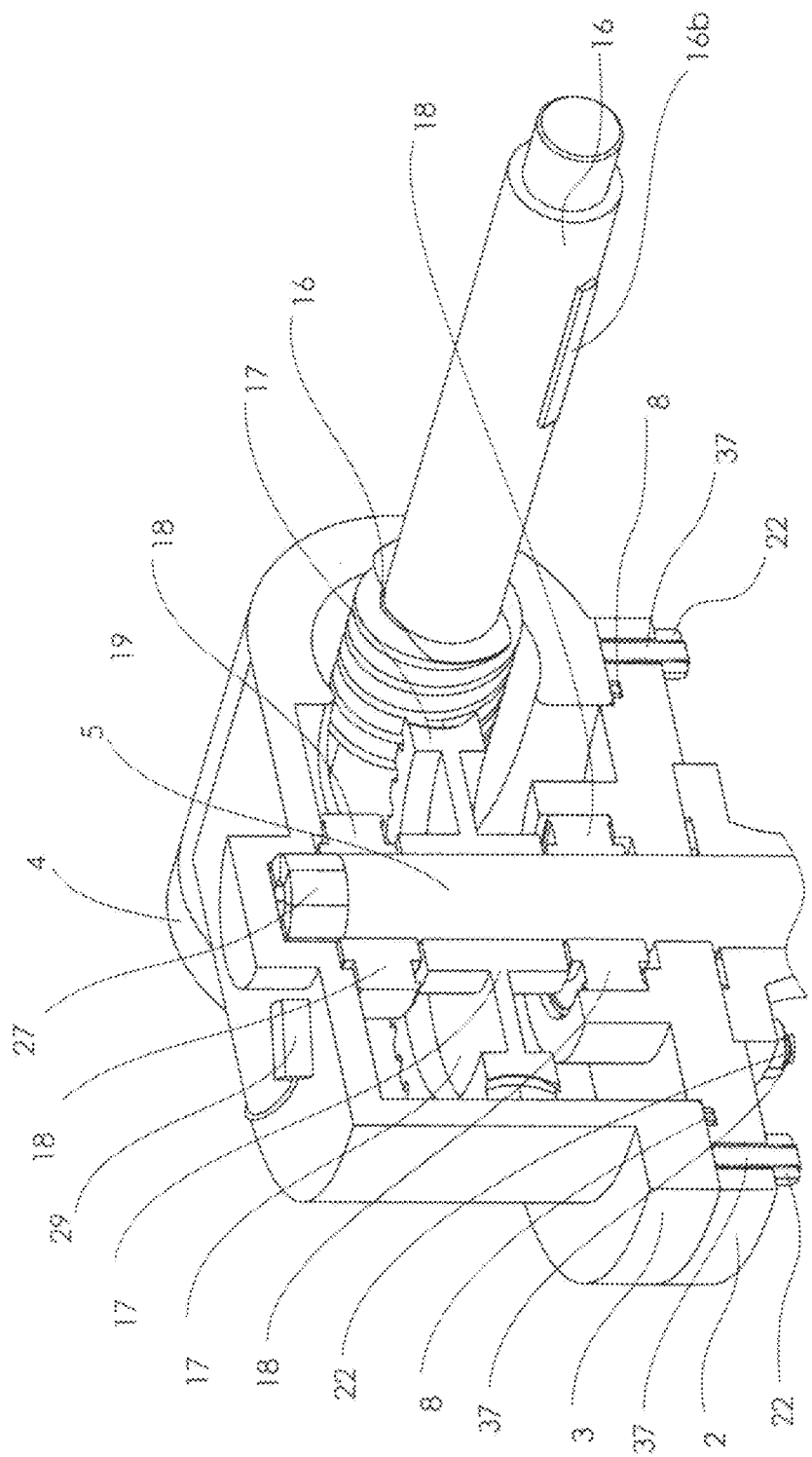
FIG. 23 is a cutaway view of the present invention shown with a ring magnet for position sensing.

FIG. 23 is a cutaway view of the present invention shown with a ring magnet for position sensing. The ring magnet 27 is an optional feature in which the ring magnet 27 is fixedly attached to the top of the shaft 5. The ring magnet 27 contains pie-shaped magnets with alternating (north and south) magnetic poles. A sensor 20 is situated outside of the enclosure 3 in proximity to the ring magnet 27. The sensor 29 determines the position of the valve (i.e., open or closed and to what degree it is open or closed) based on the position of the magnets comprising the ring magnet 27.

Figure 24:
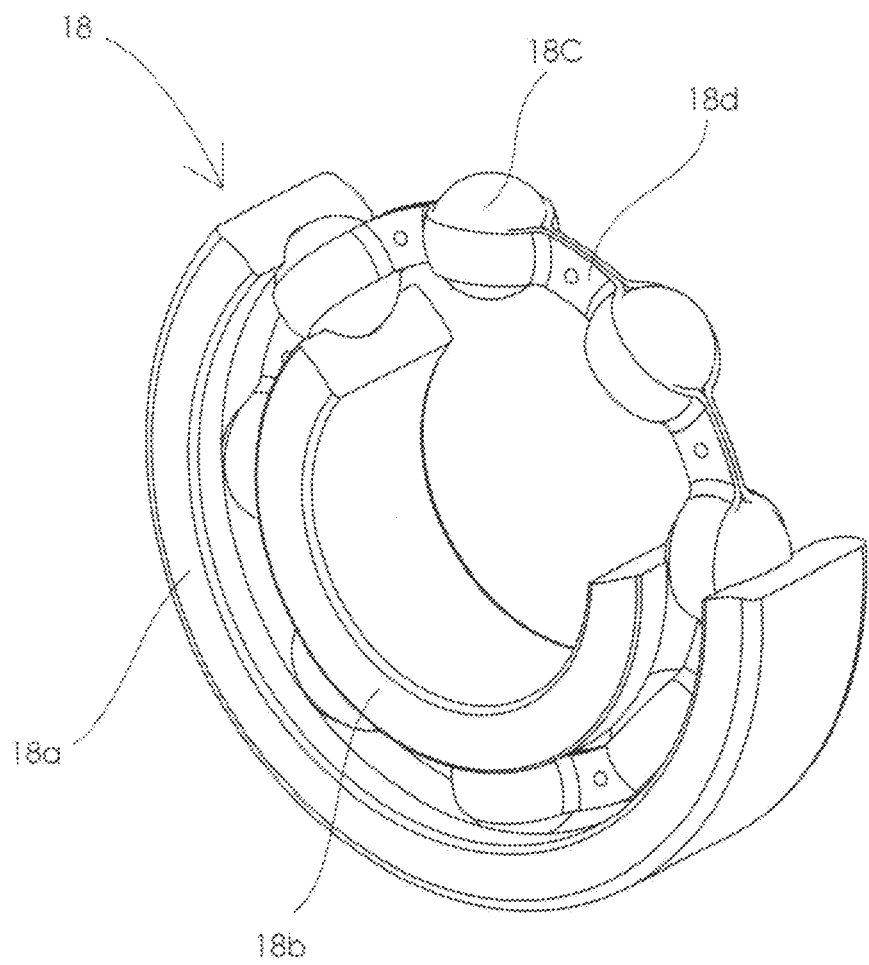
FIG. 24 is a cutaway view of a ball bearing.
Figure 25:
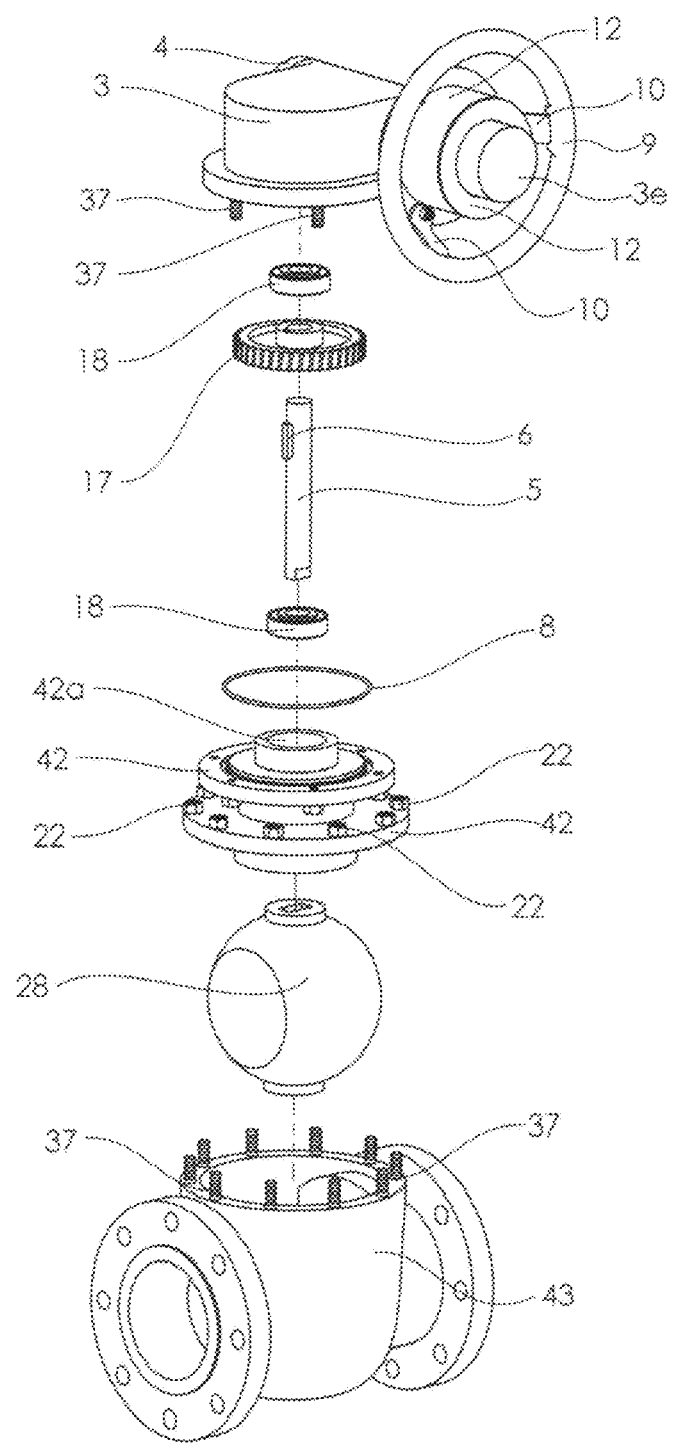
FIG. 25 is an exploded view of the top entry ball valve embodiment of the present invention.

FIG. 24 is a cutaway view of a ball bearing. As noted above, the present invention is not limited to any particular type of bearing (located on either side of the pinion gear 17 and also on either end of the worm gear 16). This figure provides a detail view of the ball bearing 18 shown in the previous figures.

Figure 26:
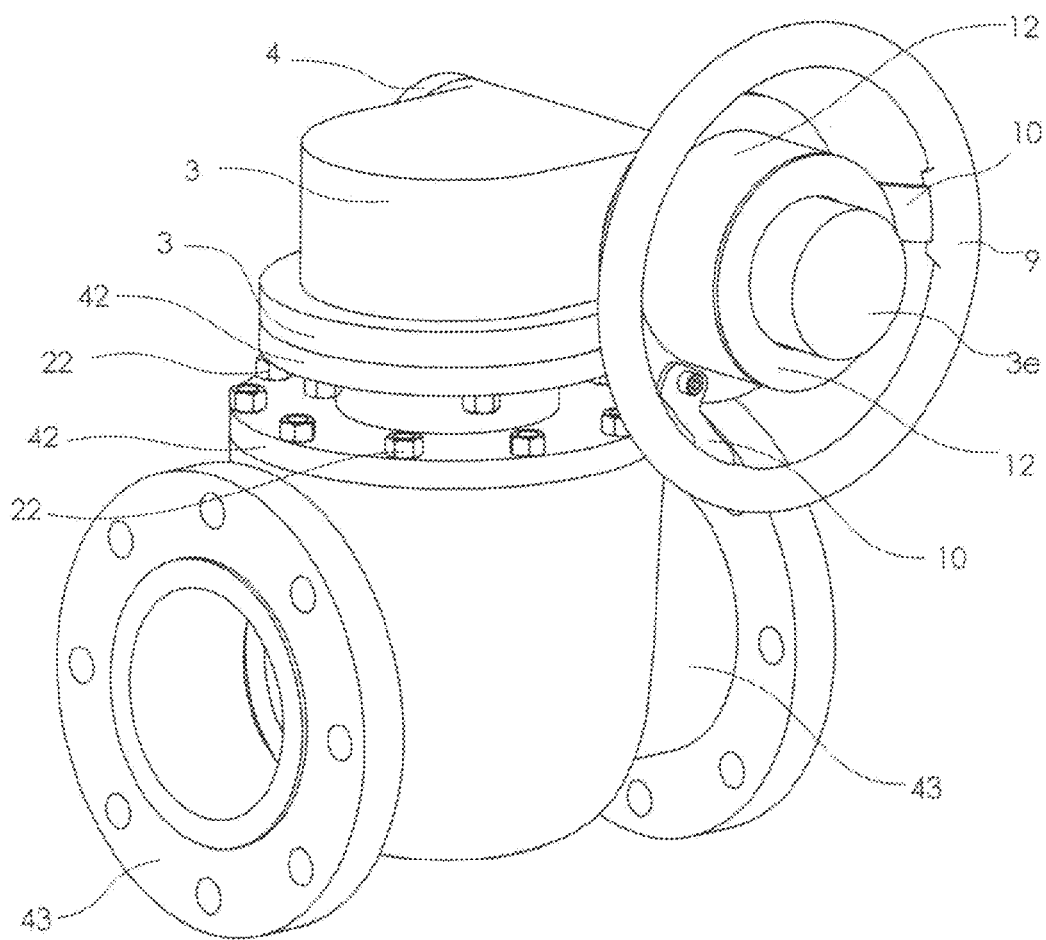
FIG. 26 is a perspective view of the top entry ball valve embodiment of the present invention.

In all of the previous figures, the present invention is shown as a retrofit that can be used with an existing rotary valve body; however, in an alternate embodiment, the present invention is a stand-alone valve that incorporates the features of the present invention. This embodiment is shown in FIGS. 25 and 26. In these figures, the adapter plate 2 of previously described embodiments is replaced with an integral adapter plate or bonnet 42, and bearing holder 2b is replaced with bearing holder 42a. Otherwise, all parts are as previously described.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A rotary valve assembly comprising:
 (a) a leak-free enclosure containing a worm gear having a first end and a second end and a pinion gear having a first side and a second side, wherein the worm gear engages with the pinion gear such that when the worm gear rotates, the pinion gear rotates as well;
 (b) an adapter plate that is situated between a rotary valve body and the enclosure and that secures the rotary valve body to the enclosure; and
 (c) a magnetic actuator assembly;
 wherein the enclosure is situated between the magnetic actuator assembly and the rotary valve body;
 wherein a shaft extends through the center of the pinion gear and causes a valve within the rotary valve body to open and close based on rotation of the shaft;
 wherein the rotary valve body is a ball valve or a butterfly valve;
 wherein the magnetic actuator assembly comprises:
 (a) a driver support that contains a plurality of outer magnets;
 (b) a driver base that holds the driver support; and
 (c) a follower support that contains a plurality of inner magnets;
 wherein the enclosure comprises a portion of the enclosure that is situated inside of the driver support between the plurality of inner magnets and the plurality of outer magnets;
 wherein the driver base is fixedly attached to an actuator wheel such that the driver base rotates when the actuator wheel rotates;
 wherein the driver base is not physically affixed to the enclosure;
 wherein the driver support is fixedly attached to the driver base such that the driver support rotates when the driver base rotates;
 wherein when the driver support rotates, a magnetic coupling between the plurality of inner magnets and the plurality of outer magnets causes the follower support to rotate;
 further comprising a magnet retainer that is secured to the enclosure and that prevents the driver base from being pulled off of the enclosure;
 wherein the enclosure protrudes through a hole in the driver base, and wherein the hole has an inside diameter;
 wherein the magnet retainer has a constant outside diameter that is greater than the inside diameter of the hole in the driver base through which the enclosure protrudes; and
 wherein the magnet retainer is situated over an end of the enclosure that protrudes through the hole in the driver base and secured to the enclosure with screws or bolts.

2. The rotary valve assembly of claim 1, further comprising a first bearing situated around the first end of the worm gear and a second bearing situated around the second end of the worm gear.

3. The rotary valve assembly of claim 2, wherein the first end of the worm gear passes through the follower support and into the first bearing, and the second end of the worm gear passes through the second bearing and is inserted into a cap that is secured to the enclosure.

4. The rotary valve assembly of claim 1, wherein the worm gear comprises a shaft that is configured to rotate with the follower support.

5. The rotary valve assembly of claim 1, further comprising a first bearing situated adjacent to the first side of the pinion gear and a second bearing situated adjacent the second side of the pinion gear.

6. The rotary valve assembly of claim 1, wherein the enclosure comprises a first positive stop and a second positive stop that prevent the pinion gear from over-rotating.

7. The rotary valve assembly of claim 1, wherein the shaft comprises a top end, and wherein the enclosure comprises a position indicator window that allows the top end of the shaft to be viewed by an operator.

8. The rotary valve assembly of claim 1, wherein the shaft comprises a top end, further comprising a ring magnet positioned on the top end of the shaft and a proximity sensor positioned outside of the enclosure and in proximity to the ring magnet.

9. A rotary valve comprising:
 (a) a rotary valve body having an integral adapter plate;
 (b) a leak-free enclosure containing a worm gear having a first end and a second end and a pinion gear having a first side and a second side, wherein the worm gear engages with the pinion gear such that when the worm gear rotates, the pinion gear rotates as well; and
 (c) a magnetic actuator assembly;
 wherein the integral adapter plate is situated between the rotary valve body and the enclosure and secured to the enclosure;
 wherein the enclosure is situated between the magnetic actuator assembly and the rotary valve body;
 wherein a shaft extends through the center of the pinion gear and causes a valve within the rotary valve body to open and close based on rotation of the shaft;
 wherein the rotary valve body is a ball valve or a butterfly valve;

wherein the magnetic actuator assembly comprises:
(a) a driver support that contains a plurality of outer magnets;
(b) a driver base that holds the driver support; and
(c) a follower support that contains a plurality of inner magnets;
wherein the enclosure comprises a portion of the enclosure that is situated inside of the driver support between the plurality of inner magnets and the plurality of outer magnets;
wherein the driver base is fixedly attached to an actuator wheel such that the driver base rotates when the actuator wheel rotates;
wherein the driver base is not physically affixed to the enclosure;
wherein the driver support is fixedly attached to the driver base such that the driver support rotates when the driver base rotates;
wherein when the driver support rotates, a magnetic coupling between the plurality of inner magnets and the plurality of outer magnets causes the follower support to rotate;
further comprising a magnet retainer that is secured to the enclosure and that prevents the driver base from being pulled off of the enclosure;
wherein the enclosure protrudes through a hole in the driver base, and wherein the hole has an inside diameter;
wherein the magnet retainer has a constant outside diameter that is greater than the inside diameter of the hole in the driver base through which the enclosure protrudes; and
wherein the magnet retainer is situated over an end of the enclosure that protrudes through the hole in the driver base and secured to the enclosure with screws or bolts.

10. The rotary valve of claim 9, further comprising a first bearing situated around the first end of the worm gear and a second bearing situated around the second end of the worm gear.

11. The rotary valve of claim 10, wherein the first end of the worm gear passes through the follower support and into the first bearing, and the second end of the worm gear passes through the second bearing and is inserted into a cap that is secured to the enclosure.

12. The rotary valve of claim 9, wherein the worm gear comprises a shaft that is configured to rotate with the follower support.

13. The rotary valve of claim 9, further comprising a first bearing situated adjacent to the first side of the pinion gear and a second bearing situated adjacent the second side of the pinion gear.

14. The rotary valve of claim 9, wherein the enclosure comprises a first positive stop and a second positive stop that prevent the pinion gear from over-rotating.

15. The rotary valve of claim 9, wherein the shaft comprises a top end, and wherein the enclosure comprises a position indicator window that allows the top end of the shaft to be viewed by an operator.

16. The rotary valve of claim 9, wherein the shaft comprises a top end, further comprising a ring magnet positioned on the top end of the shaft and a proximity sensor positioned outside of the enclosure and in proximity to the ring magnet.

17. A rotary valve assembly comprising:
(a) a leak-free enclosure containing a worm gear having a first end and a second end and a pinion gear having a first side and a second side, wherein the worm gear engages with the pinion gear such that when the worm gear rotates, the pinion gear rotates as well;
(b) an adapter plate that is situated between a rotary valve body and the enclosure and that secures the rotary valve body to the enclosure; and
(c) a magnetic actuator assembly;
wherein the enclosure is situated between the magnetic actuator assembly and the rotary valve body;
wherein a shaft extends through the center of the pinion gear and causes a valve within the rotary valve body to open and close based on rotation of the shaft;
wherein the rotary valve body is a ball valve or a butterfly valve;
wherein the magnetic actuator assembly comprises:
(a) a radial enclosure;
(b) a radial driver support containing a plurality of radial driver magnets;
(c) a radial follower support containing a plurality of radial follower magnets; and
(d) a radial cap that is attached to the radial enclosure and situated between the radial driver support and the radial follower support, wherein a portion of the radial cap extends through a central aperture in a radial driver cap;
wherein the worm gear is configured to rotate with the radial follower support; and
wherein an actuator wheel is fixedly attached to the radial driver cap, and wherein the radial driver cap is fixedly attached to the radial driver support;
further comprising a magnet retainer that is secured to the radial cap and that prevents the radial driver cap from being pulled off of the radial cap;
wherein the magnet retainer is a plate that lies flat against an outer surface of the radial driver cap; and
wherein the central aperture in the radial driver cap has an inside diameter, the magnet retainer has an outside diameter, and the outside diameter of the magnet retainer is greater than the inside diameter of the central aperture in the radial driver cap.

18. A rotary valve comprising:
(a) a rotary valve body having an integral adapter plate;
(b) a leak-free enclosure containing a worm gear having a first end and a second end and a pinion gear having a first side and a second side, wherein the worm gear engages with the pinion gear such that when the worm gear rotates, the pinion gear rotates as well; and
(c) a magnetic actuator assembly;
wherein the integral adapter plate is situated between the rotary valve body and the enclosure and secured to the enclosure;
wherein the enclosure is situated between the magnetic actuator assembly and the rotary valve body;
wherein a shaft extends through the center of the pinion gear and causes a valve within the rotary valve body to open and close based on rotation of the shaft;
wherein the rotary valve body is a ball valve or a butterfly valve;
wherein the magnetic actuator assembly comprises:
(a) a radial enclosure;
(b) a radial driver support containing a plurality of radial driver magnets;
(c) a radial follower support containing a plurality of radial follower magnets; and
(d) a radial cap that is attached to the radial enclosure and situated between the radial driver support and the radial follower support, wherein a portion of the radial cap extends through a central aperture in a radial driver cap;
wherein the worm gear is configured to rotate with the radial follower support; and wherein an actuator wheel is fixedly attached to the radial driver cap, and wherein the radial driver cap is fixedly attached to the radial driver support;

further comprising a magnet retainer that is secured to the radial cap and that prevents the radial driver cap from being pulled off of the radial cap;

wherein the magnet retainer is a plate that lies flat against an outer surface of the radial driver cap; and wherein the central aperture in the radial driver cap has an inside diameter, the magnet retainer has an outside diameter, and the outside diameter of the magnet retainer is greater than the inside diameter of the central aperture in the radial driver cap.

\* \* \* \* \*